Feb. 9, 1937.   L. S. JOSLIN   2,069,886
ROTARY PARKING UNIT
Filed May 10, 1932   21 Sheets-Sheet 1

INVENTOR
LAWRENCE S. JOSLIN
by Roberts, Cushman & Woodberry
ATTYS

Feb. 9, 1937.  L. S. JOSLIN  2,069,886
ROTARY PARKING UNIT
Filed May 10, 1932  21 Sheets-Sheet 3

INVENTOR
LAWRENCE S. JOSLIN
by Roberts, Cushman & Woodbury
ATTYS

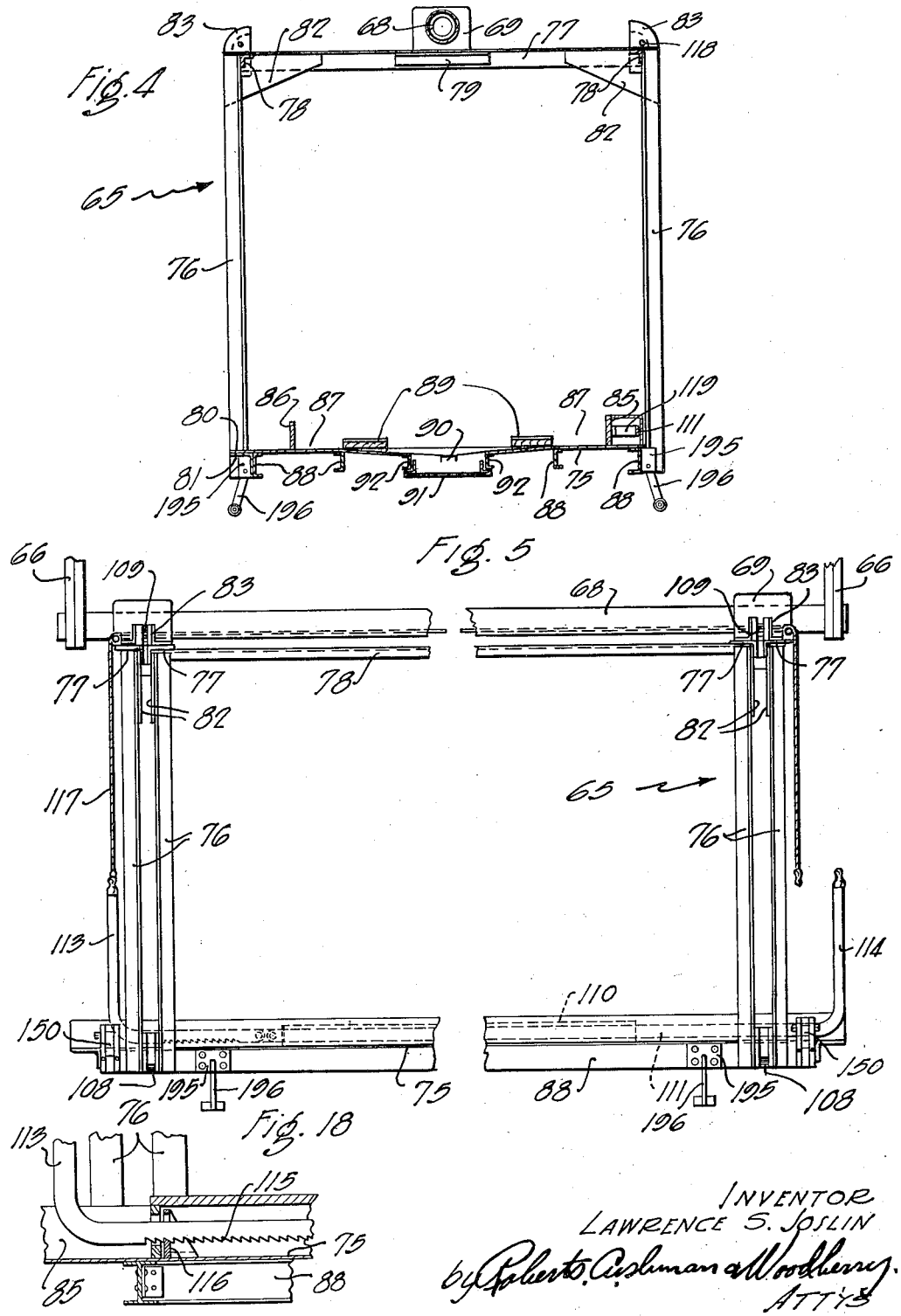

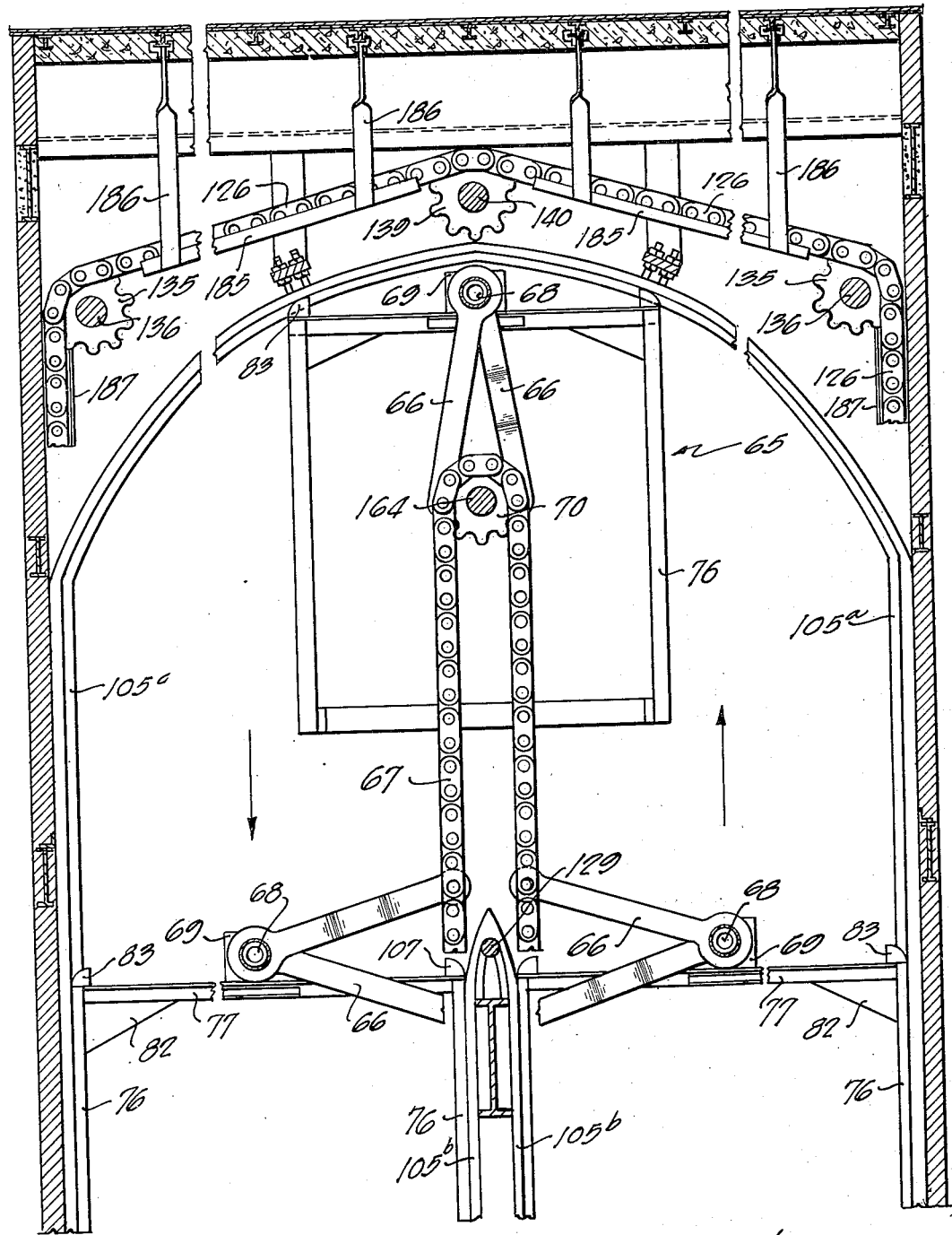

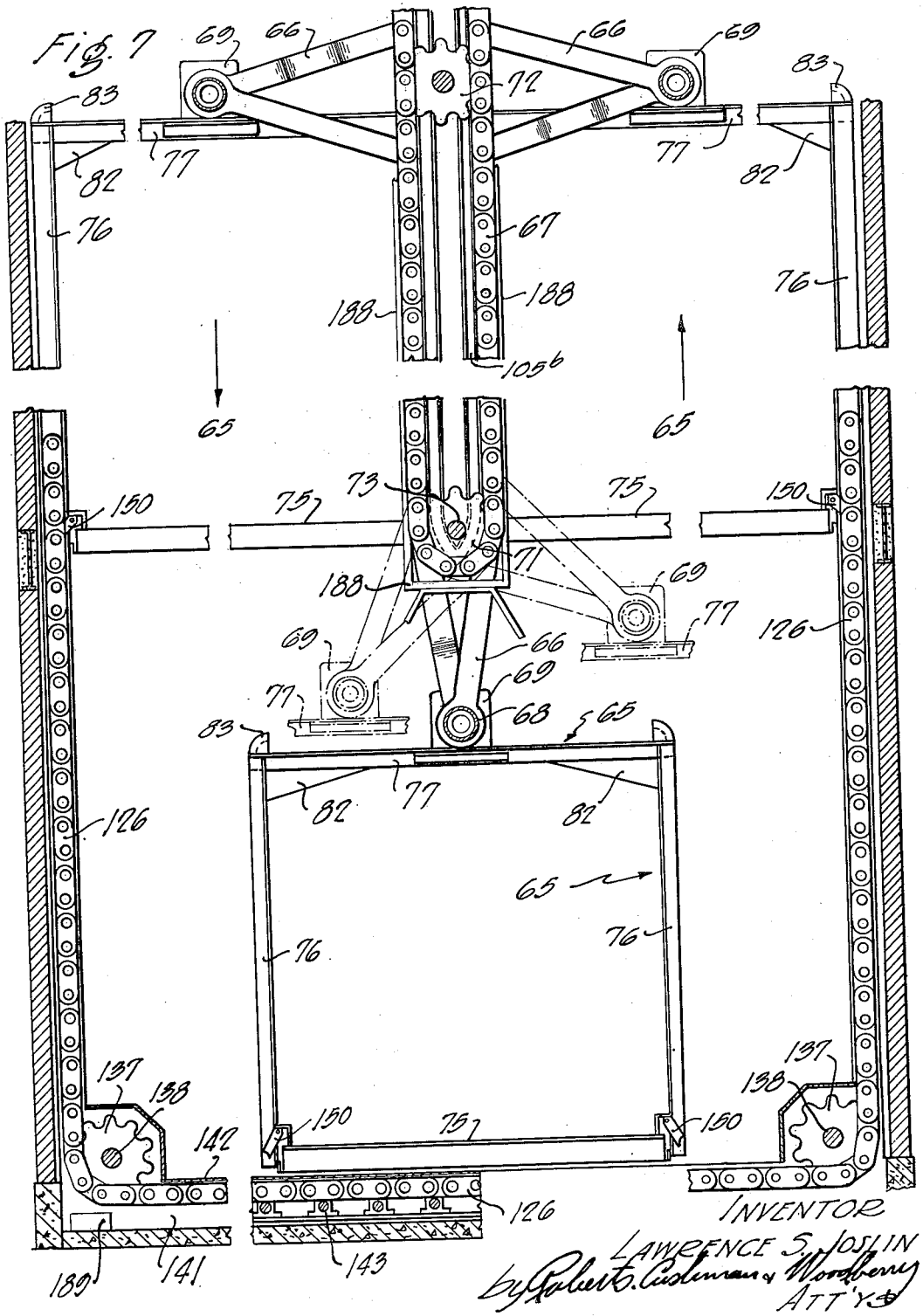

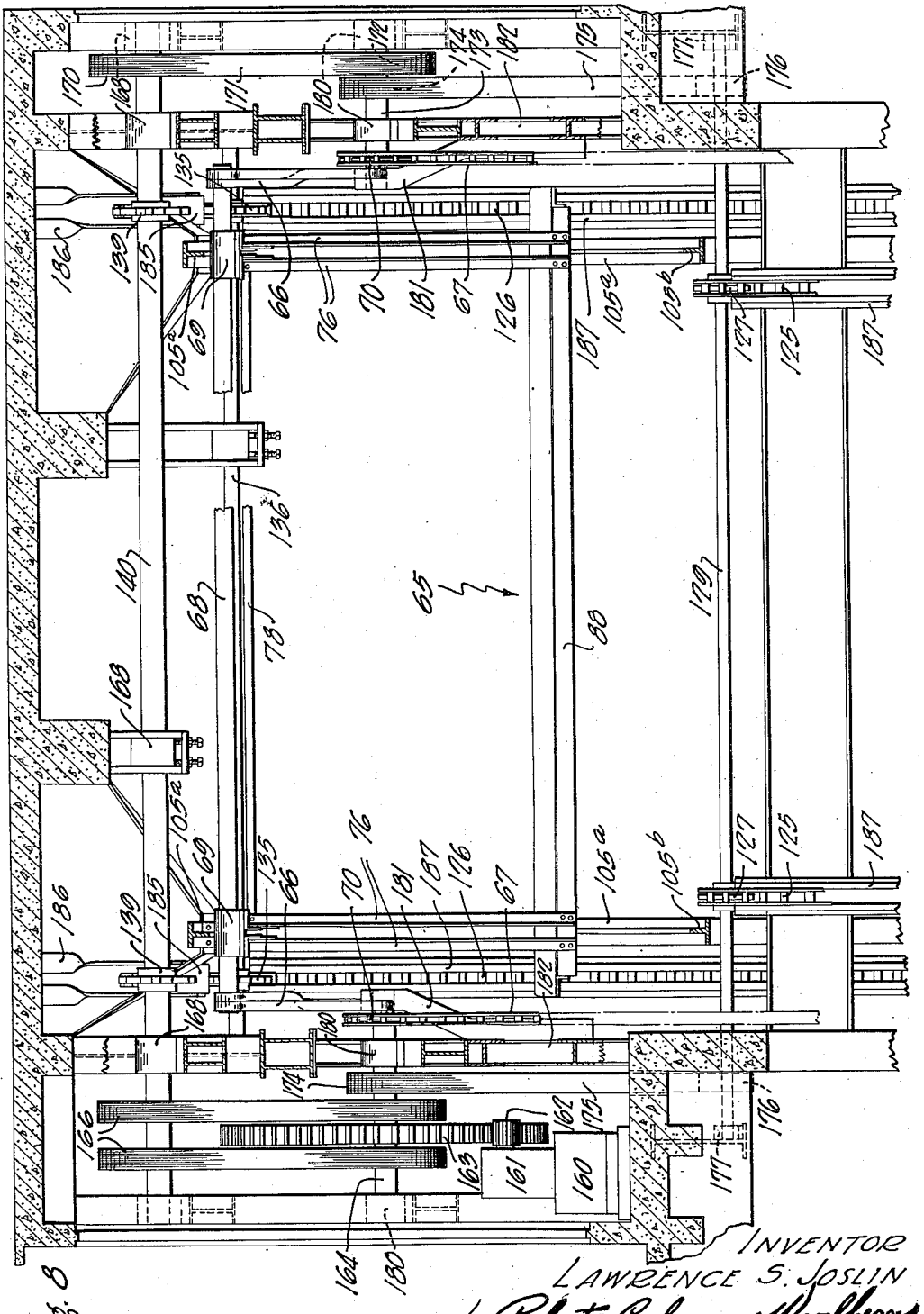

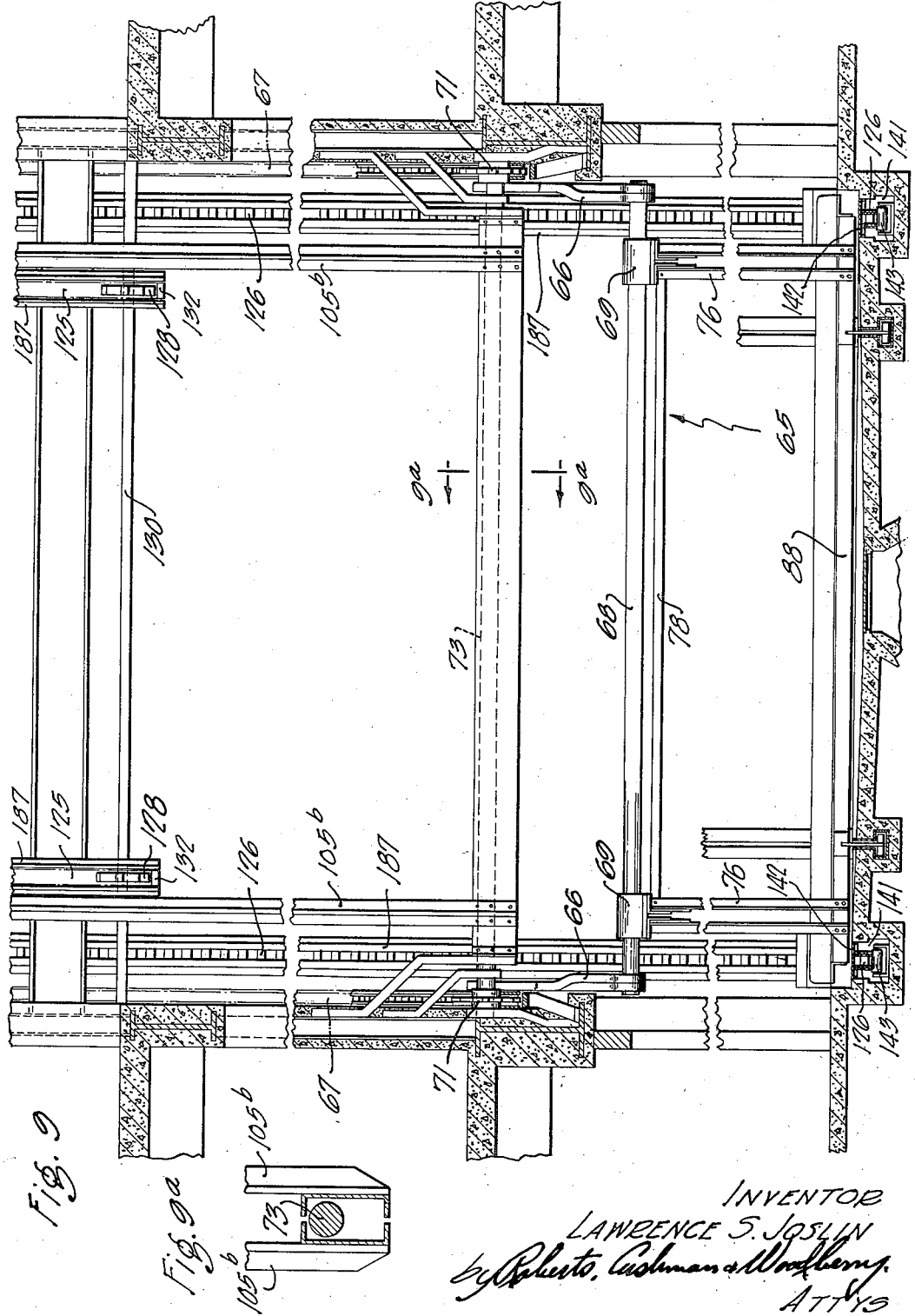

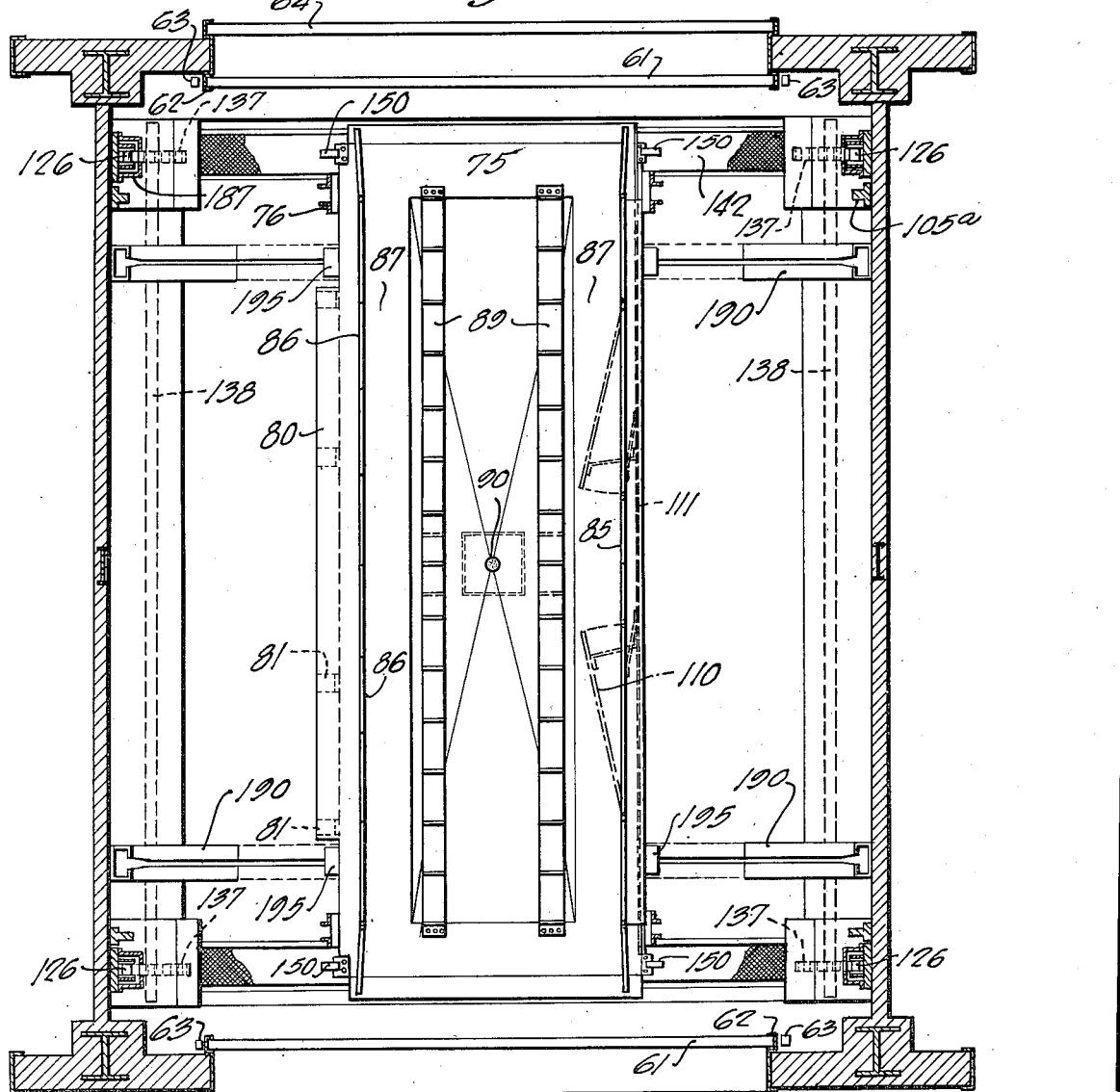

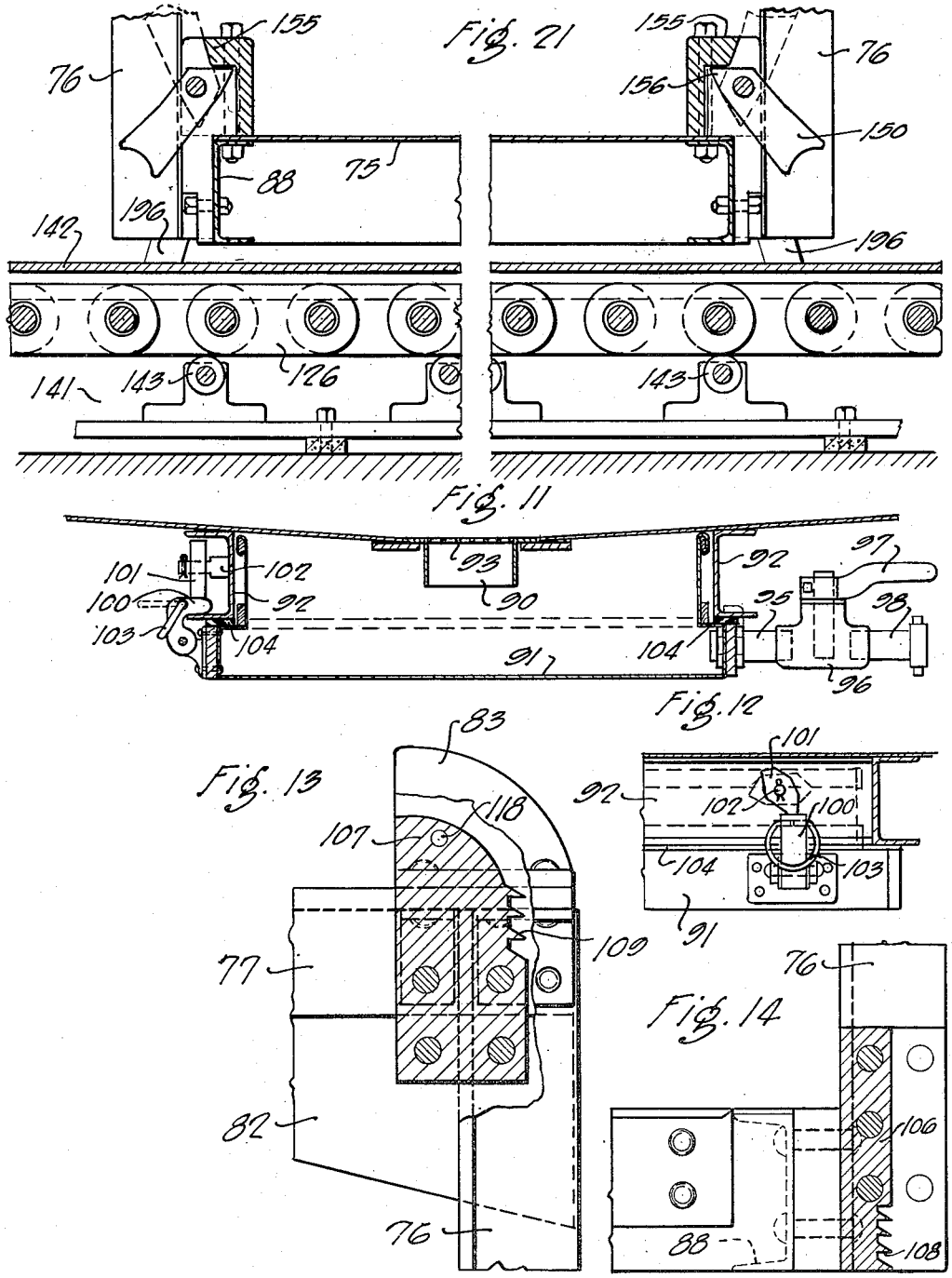

Feb. 9, 1937.　　　　L. S. JOSLIN　　　　2,069,886
ROTARY PARKING UNIT
Filed May 10, 1932　　　21 Sheets-Sheet 11
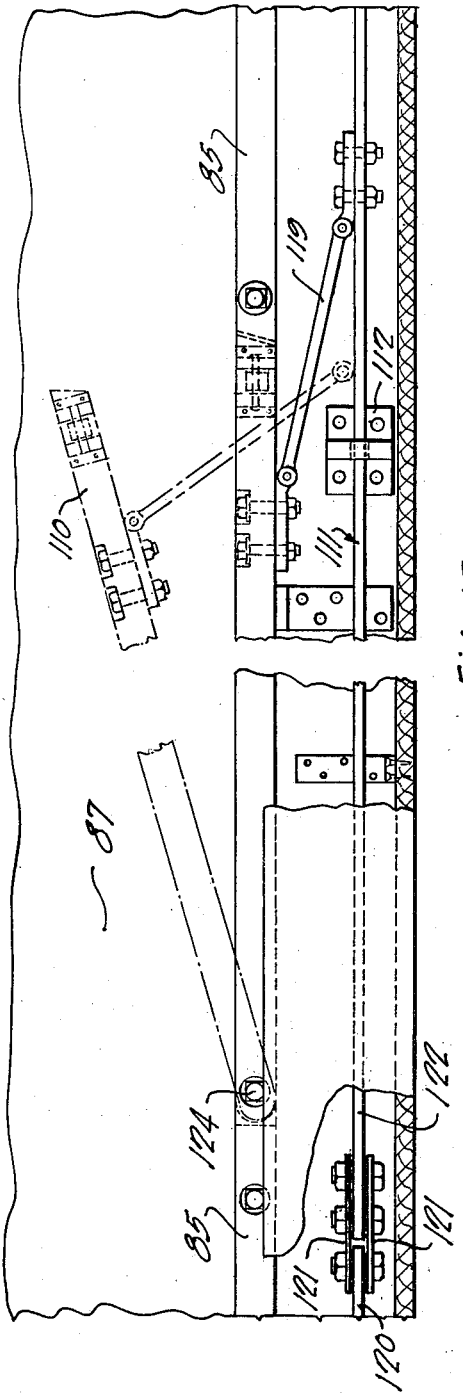
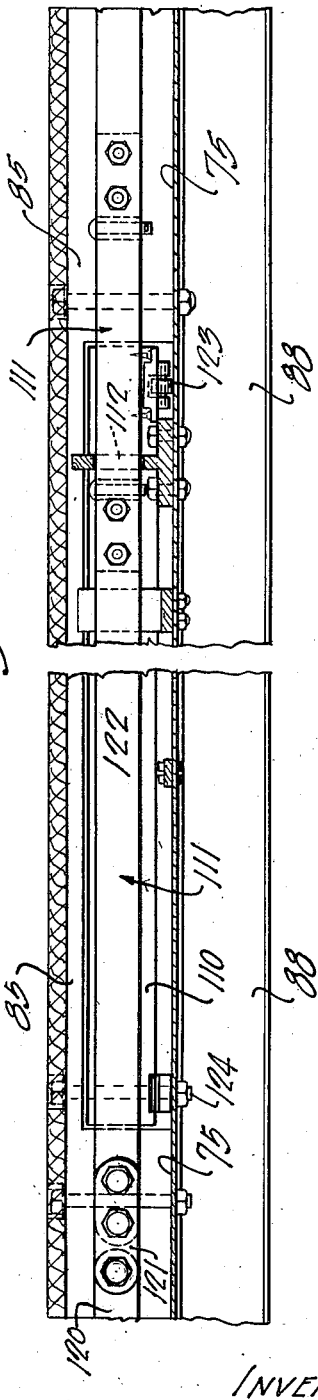
INVENTOR
LAWRENCE S. JOSLIN
by Roberts, Cushman and Woodberry
ATT'YS Feb. 9, 1937. L. S. JOSLIN 2,069,886
ROTARY PARKING UNIT
Filed May 10, 1932 21 Sheets-Sheet 12

Feb. 9, 1937.　　　　L. S. JOSLIN　　　　2,069,886
ROTARY PARKING UNIT
Filed May 10, 1932　　　　21 Sheets-Sheet 14

INVENTOR
LAWRENCE S. JOSLIN
by Roberts, Cushman & Woodberry
ATTYS

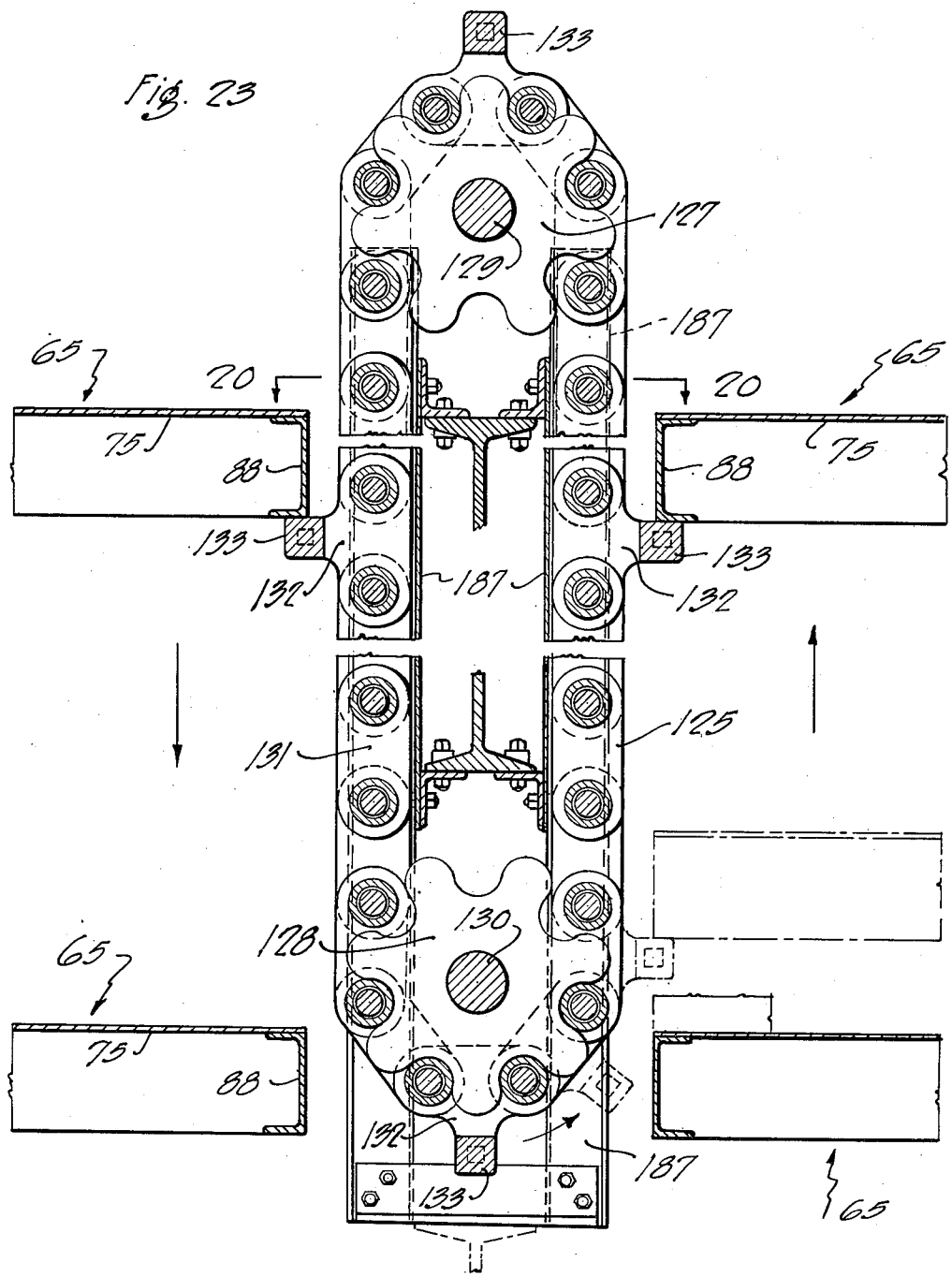

Feb. 9, 1937.    L. S. JOSLIN    2,069,886
ROTARY PARKING UNIT
Filed May 10, 1932    21 Sheets-Sheet 16

INVENTOR
LAWRENCE S. JOSLIN
by Roberts, Cushman & Woodberry
ATT'YS

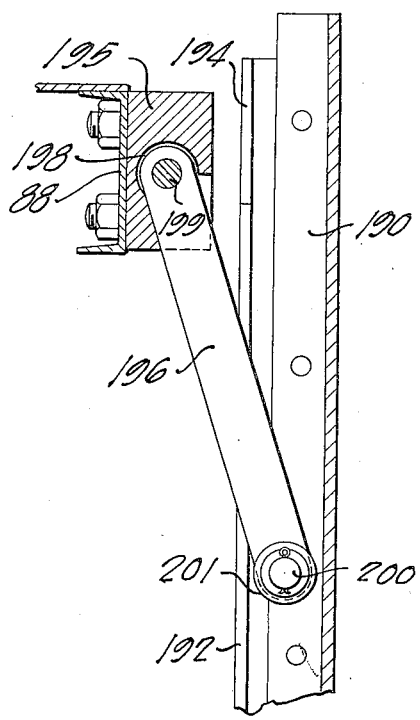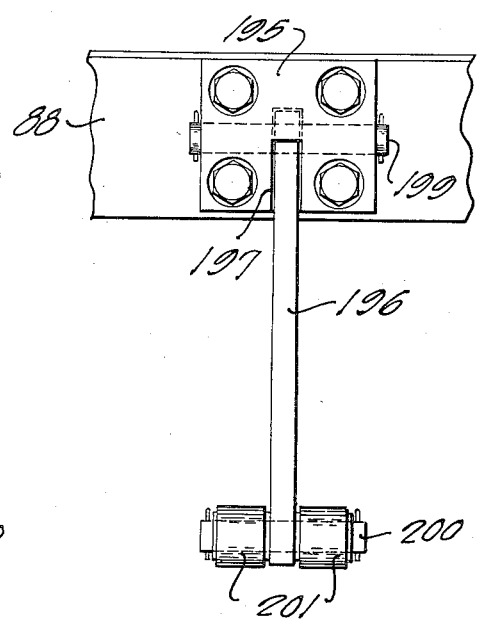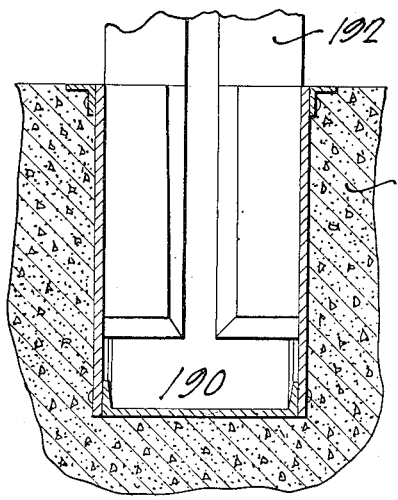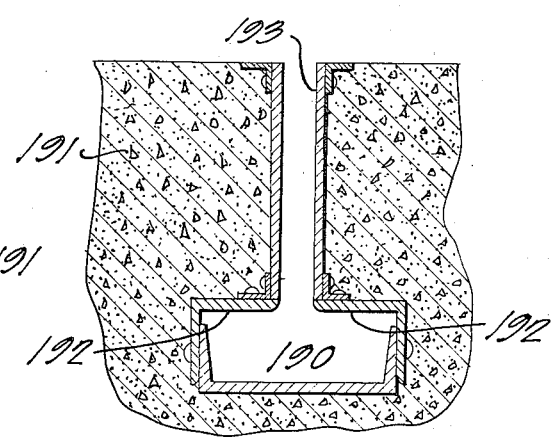

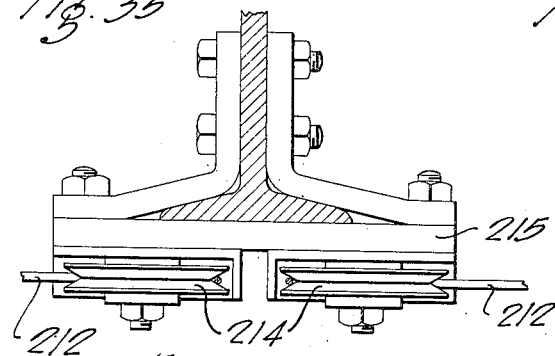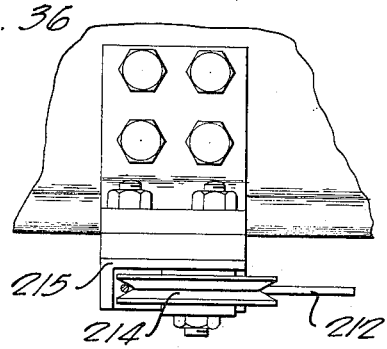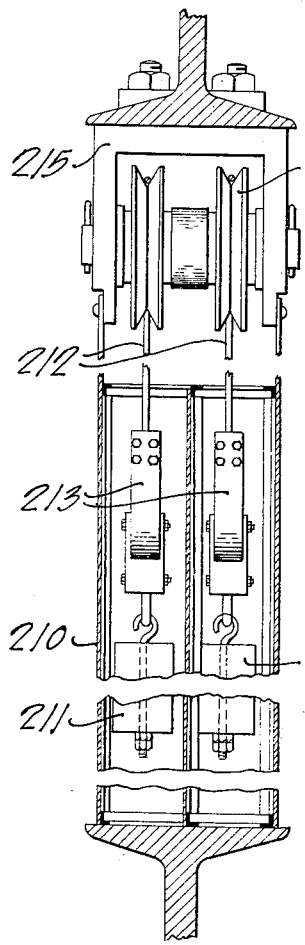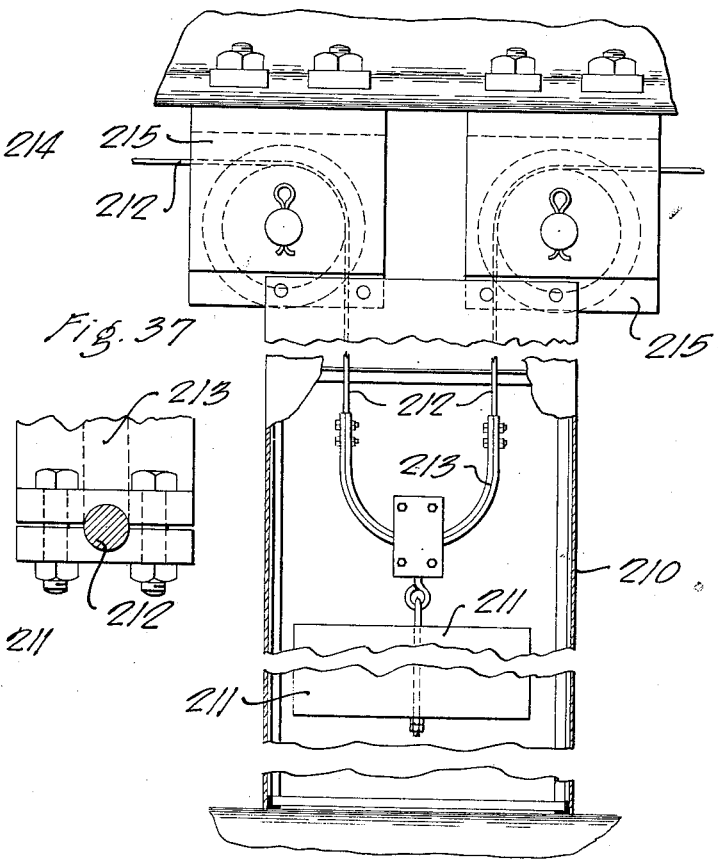

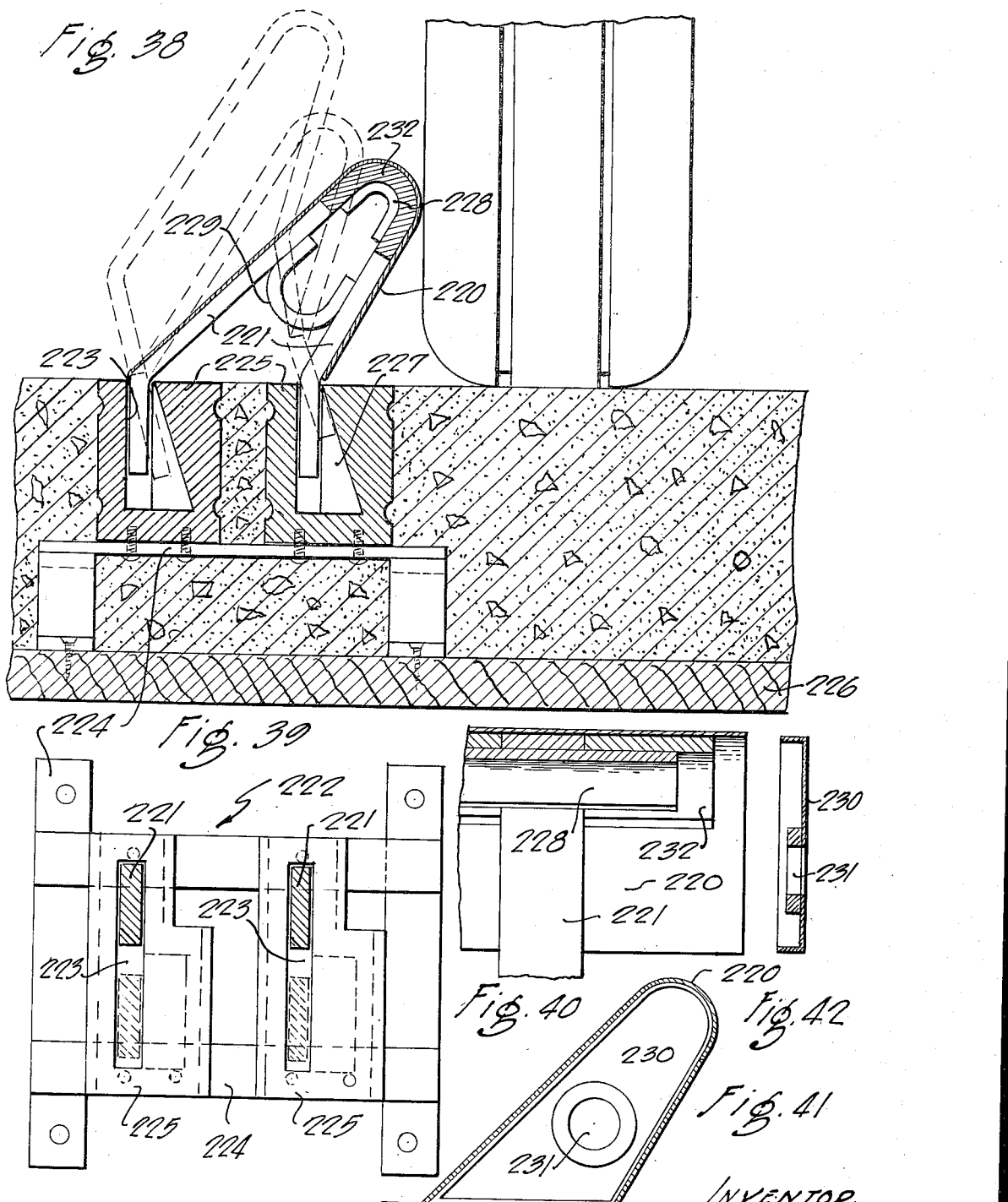

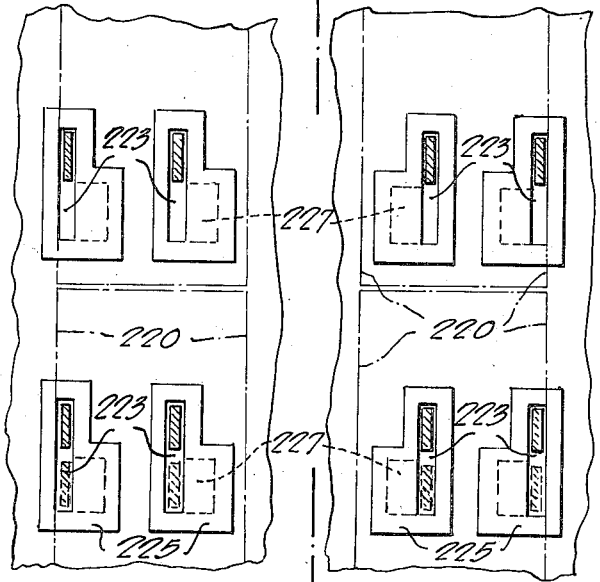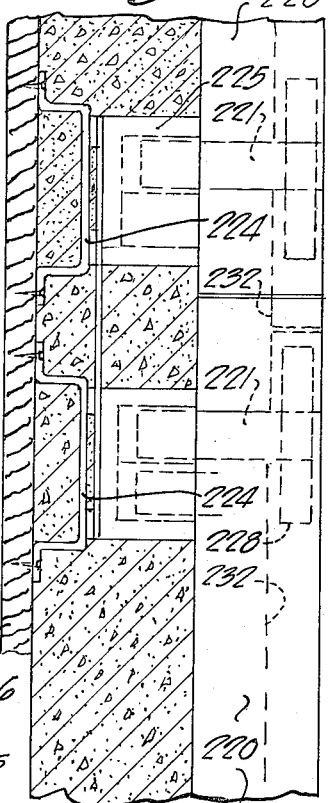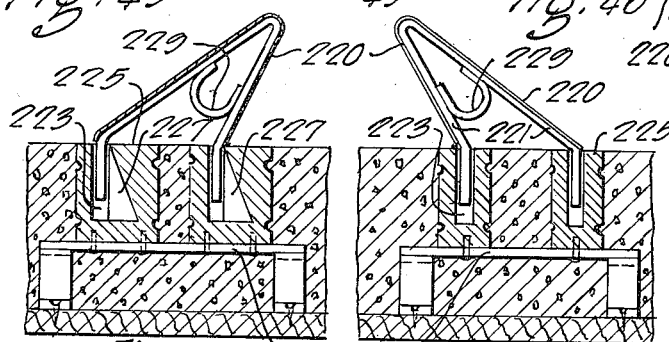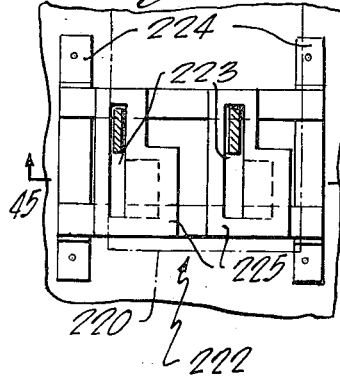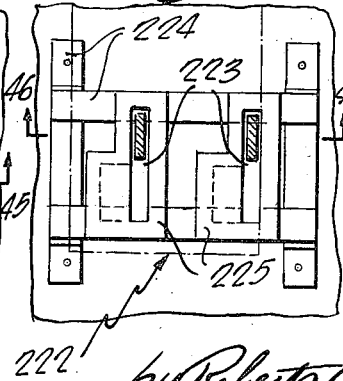

Patented Feb. 9, 1937

2,069,886

UNITED STATES PATENT OFFICE 2,069,886

ROTARY PARKING UNIT

Lawrence S. Joslin, Braintree, Mass.

Application May 10, 1932, Serial No. 610,390

14 Claims. (Cl. 214—16.1)

This invention relates to an improvement in elevators and in buildings equipped with such elevators.

One application of this invention is in garages where automobiles are parked on different floors and must be transported to and from the upper floors by elevators. The form of elevator here employed comprises cradles by which the automobiles are not only raised to the various floors, but on which the automobiles may also be parked, such cradles being rotatably supported, and is accordingly hereinafter designated as a rotary parking unit.

A garage equipped with such parking units is capable of containing a greater number of cars per square foot and per cubic foot than is possible with any other type of garage building. The story heights or the distances from top to top of the floors need only be the height of the highest cars to be parked plus the depth of the floor construction and a few inches of clearance except at the first floor and basement, which are the only ones on which the cars are to be driven and which are higher than the floors above due to the construction of the parking units, as will be described below.

The parking unit comprises a plurality of cradles, each cradle adapted to receive and transport a single car. The cradles travel upwardly and downwardly in the wells and horizontally at the top and bottom thereof. Upon the arrival of a cradle at a desired floor a car is pushed off or on the cradle by hand and preferably, as will be explained later, guiding means are provided on the upper floors to receive the wheels of the car thereby keeping them in line and providing a space between the lines of cars of ample width to permit walking between the parallel lines of cars and opening of the doors without damage to other cars. Such means may be grooves built into the floors or may be guides removably fixed in position on the floors, and so constructed that they can be easily removed leaving the floors free from obstruction.

The primary object of this invention is to provide a construction which, as pointed out above, will conserve space and increase the available parking area of a garage. A further object of this invention is to provide parking units in which the cars may be stored and by which the cars may be transported to and from the various levels. Other objects of the invention reside in the particular details of construction and operation which will be pointed out in detail hereinbelow and which will be apparent to any one skilled in the art from an examination of the following specification and of the drawings which form a part thereof and in which:

Fig. 4 is a cross section of one of the cradles of the parking unit;

Fig. 5 is a side elevation, partly broken away, of one of the cradles of the parking unit;

Figs. 6 and 7 are sectional views illustrating the cradle operating means and the positions of the cradles at the top and bottom, respectively, of a parking unit well;

Figs. 8 and 9 are views similar to Figs. 6 and 7 taken at right angles thereto;

Fig. 9a is a section taken along line 9a—9a of Fig. 9;

Fig. 10 is a plan view of a cradle at the bottom of a well;

Fig. 11 is a sectional view of the bottom of a cradle illustrating the drainage means therefor;

Fig. 12 is a fragmentary side elevation of such drainage means;

Figs. 13 and 14 are enlarged views, with parts broken away, the safety means at the bottom and top of the cradle;

Fig. 15 is a side elevation of a portion of the bottom of a cradle;

Figs. 16 and 17 are plan and side elevation views of the car locking mechanism;

Fig. 18 is an enlarged view partly in section of a detail of the locking mechanism;

Fig. 21 is a sectional view of a cradle at the bottom of the well, and illustrates the supported chain under the floor;

Fig. 23 is an elevation of the inner supporting chains and the guard therefor, and illustrating various positions of the cradles;

Figs. 27 and 28 are views on a larger scale illustrating one of the sway-preventing arms;

Figs. 29 and 30 are cross-sectional views on a larger scale illustrating portions of the guideway which are engaged by such arms;

Figs. 33 and 34 are elevations partly in section on a larger scale of the weights of such mechanism;

Figure 1:
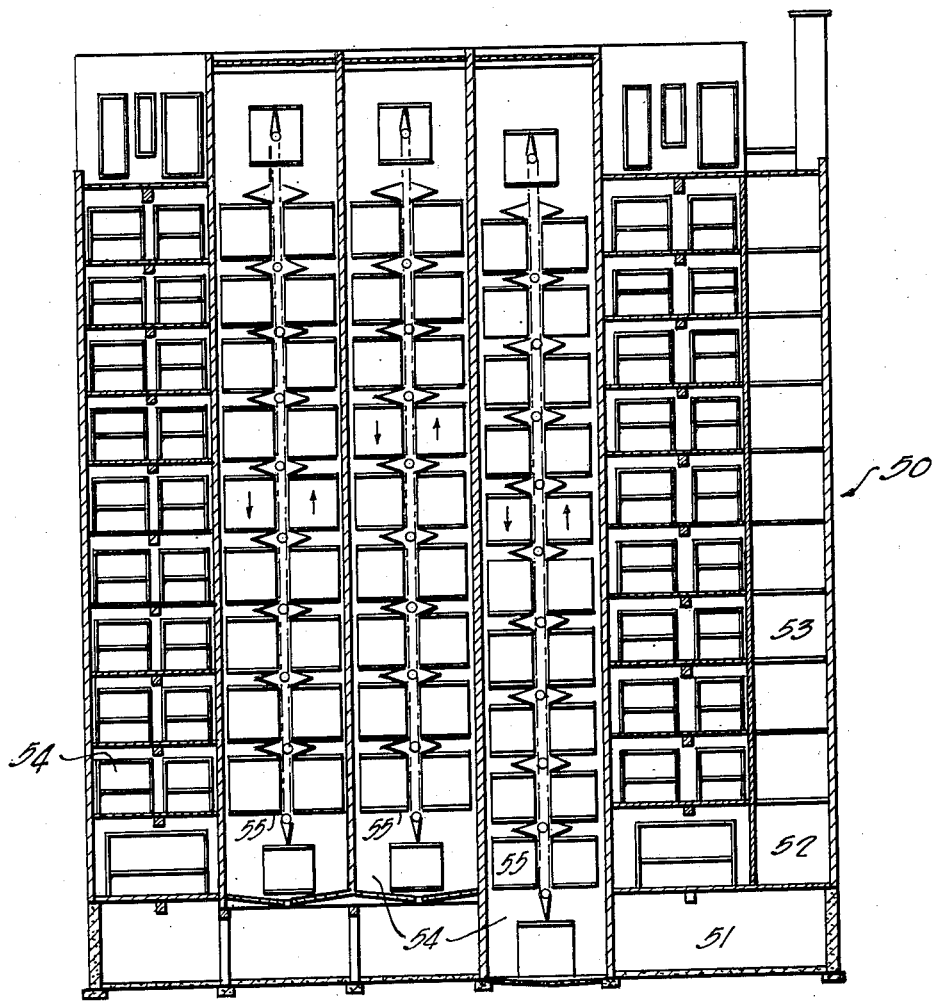
Fig. 1 is a cross-sectional elevation on the line 1—1 of Fig. 2 of a garage embodying this invention and provided with a plurality of parking units made in accordance therewith.

Figs. 35, 36, and 37 illustrate other details of such mechanism;

Fig. 38 is a view illustrating a portion of a floor provided with another form of guide for the car wheels;

Fig. 39 is a plan view of a support for a guide;

Figs. 40, 41, and 42 illustrate details of the guides;

Figs. 43 to 48 are views illustrating two pairs of guides which coact to form car channels; and Fig. 49 is an enlarged sectional view taken along the line 49—49 of Fig. 44 and showing the manner in which the adjacent guides are connected.

This invention is set forth in the drawings, and will hereafter be described as applied to a parking garage, but it will be understood that it is not limited thereto and that the invention is applicable wherever it is desired to transport vertically and store articles.

The garage 50 selected for the purpose of illustrating this invention comprises a basement floor 51, a street floor 52, and a plurality of upper floors 53. Mounted in suitable elevator wells 54 are parking units 55 which embody one form of this invention.

Figure 2:
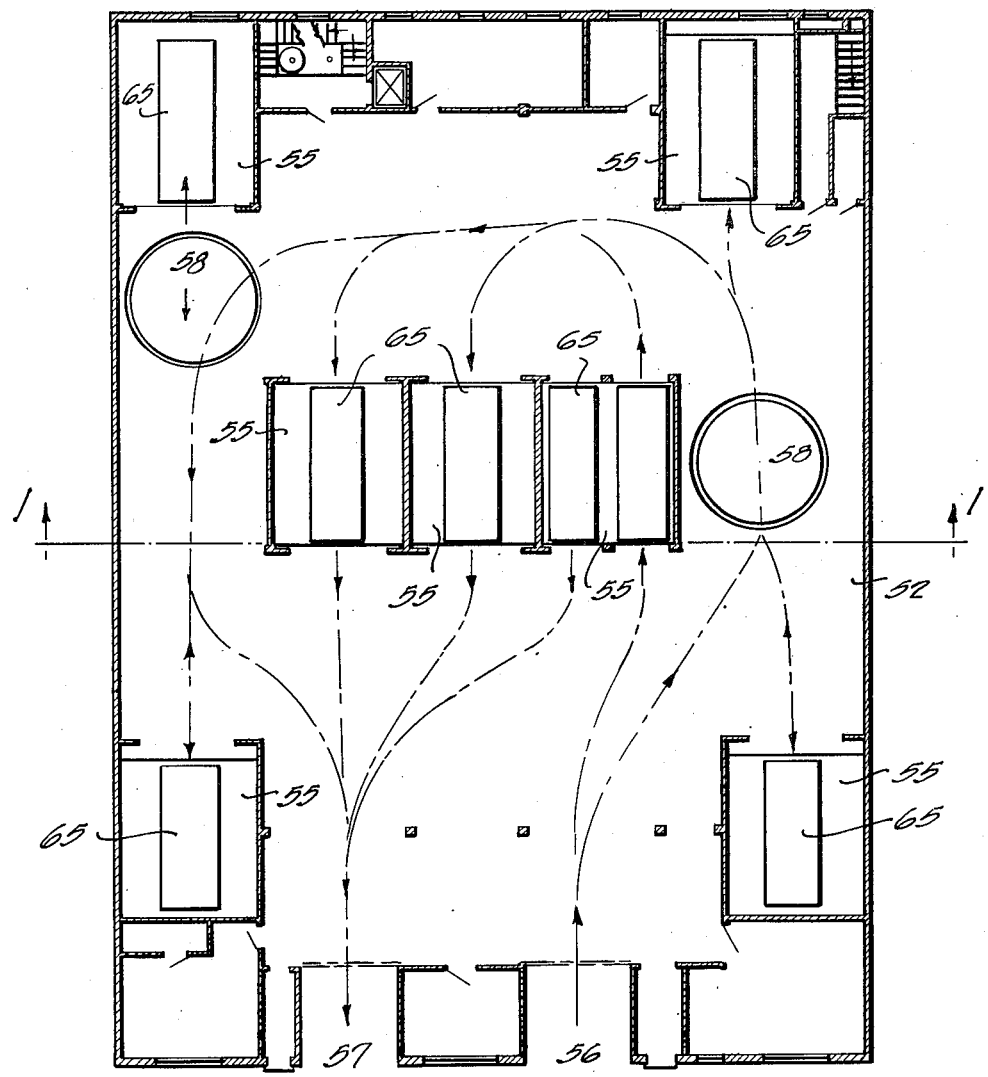
Fig 2 is a plan view of a typical first or street floor of such a garage.

It will be noted that the street floor 52, as shown in Fig. 2, comprises an entrance 56, and an exit 57. The cars passing through the entrance travel in the manner indicated by the arrows to the various parking units 55 from which they are transported to the various floors. Arrows are also employed in Fig. 2 to illustrate the manner of removing the cars from the units to the exit 57. In the particular building selected for illustration there are provided a bank of three parking units in the center and also four other parking units, two installed in the rear corners and two adjacent the front corners of the floor. Offices, hallways, passenger elevators, staircases, etc. are provided for various purposes. It will be noted that in this particular embodiment, turntables 58 are disclosed to facilitate in the handling of the cars. No cars are intended to be parked on the first floor, but, if occasion should require it, as when there is no other parking space available, this floor may also be so used as far as possible without interfering with the operation of the parking units or the movement of the cars.

Referring to Fig. 2, it will be noted that all the parking units, with the single exception of the right-hand unit in the center bank, terminate at the street floor. This corresponds with the construction illustrated in Fig. 1 wherein is shown that by only one of the parking units is access had to the basement. Access to the basement is often not necessary or desired as was illustrated here, and it will be understood that applicant is not limited to the particular arrangement disclosed, and that many variations thereof may be made if desired, for example in place of extending one of the parking units to the basement all the units may start at the street floor, and if the basement is to be used for parking purposes access may be had thereto by means of a ramp, not shown or on the other hand all the units may be extended to the basement.

Figure 3:
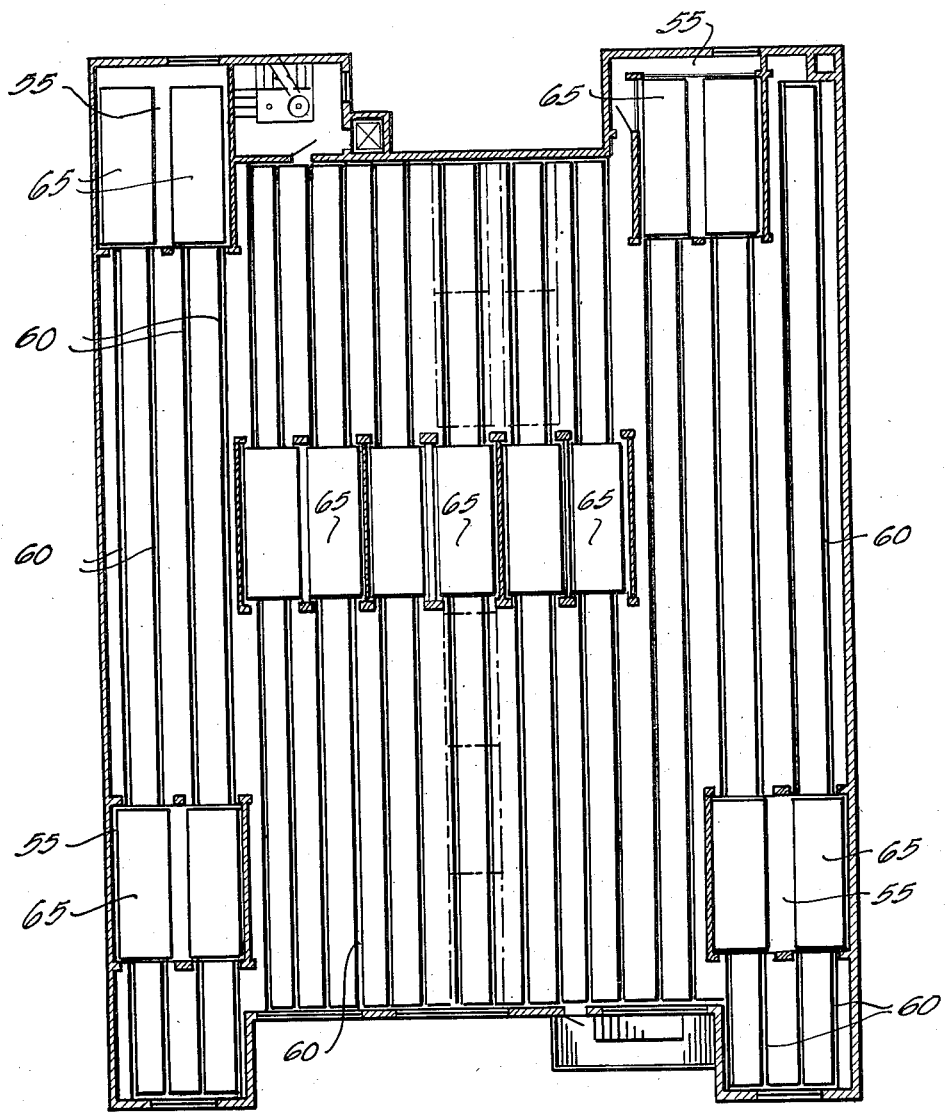
Fig. 3 is a plan view of a typical upper floor.
Figure 22:
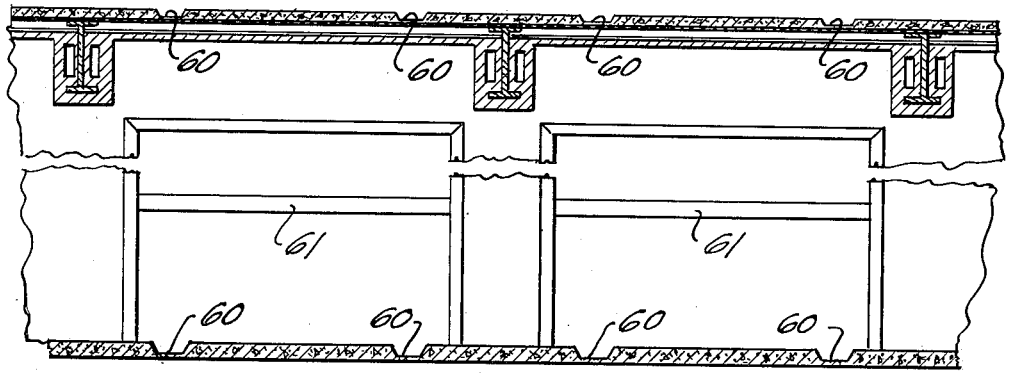
Fig. 22 is a section taken through two upper floors.

In the upper floors, a typical plan of one of which is illustrated in Fig. 3, each of the parking units, except that affording access to the basement, presents simultaneously two cradles at the floor level. The movement of the cars to and from the cradles is directed by guiding means here shown as comprising a plurality of grooves 60 in the floor which act upon the wheels of the cars thus insuring their proper travel and parking and preventing damage to the cars. Dotted lines are used in this figure to indicate several cars parked on the floor. It will be noted that to the first and second pair of grooves at the left cars may be supplied from either of two parking units 55, the cars for the first pair of grooves being delivered by the left-hand pair of cradles and the cars for the second pair of grooves by the right-hand pair of cradles. The manner in which the other pairs of grooves in the floor may be supplied with cars is, of course, apparent from a consideration of Fig. 3. In this connection, attention is called to the showing in Fig. 22 wherein the floors are shown in cross section. It will be noted that the grooves 60 are shallow and hence, should occasion require, as for example, in case one of the parking units were out of commission for some reason or other, the cars in the grooves supplied by such unit may be easily jacked up and moved to pairs of grooves in front of other units and thus taken down to the street floor. In place of the grooves 60 removable guides may be employed, as shown in Figs. 38 to 49 inclusive and described hereinbelow.

The entrances to the wells 54 are normally closed as by gates 61 which travel vertically in guides 62 and are provided with counterweights 63. Fire doors 64 normally open are also provided, which doors close automatically in any well-known manner in case of fire or other emergency. The gates 61 are so mounted that by structure, which will be described later, the pairs of gates giving access to a cradle are raised and lowered in unison so that an operator at either end of a cradle can move both simultaneously.

Each parking unit comprises a plurality of cradles 65 which, as shown in Figs. 6, 7, 8, and 9, are substantially rectangular in conformation, each cradle being supported by pairs of arms 66 carried by endless chains 67. The arms, as shown in Fig. 5, engage the ends of a pipe or shaft 68 mounted in brackets 69 on the roofs of the cradles and are so constructed that the cradles at all times maintain their horizontal position. The endless chains 67 travel upon driven head sprockets 70, foot sprockets 71 on shaft 73, and a plurality of intermediate idler sprockets 72. Each cradle (see Figs. 4 and 5) comprises a floor 75, pairs of posts 76 at the four corners of the floor, end angle beams 77 which connect the pairs of posts at their upper ends, and side angle beams 78 which connect the tie beams 77 at the corners and thus produce a rigid structure. The brackets 69 which support the pipe 68 are mounted on the tie beams 77, which beams are reinforced by angle plates 79. One side of the cradle floor 75, the left, as shown in Fig. 10, is extended to form a step 80 mounted upon brackets 81. Such step provides a surface on which the driver may place the foot when alighting from the car in the cradle. As a further reinforcement, each post 76 is connected to the cross-beam 77 associated with it by a gusset plate 82. Mounted upon the cross-beams 77 are angle guides 83 spaced apart, as shown in Fig. 5, and having a purpose which will be described later.

Figure 19:
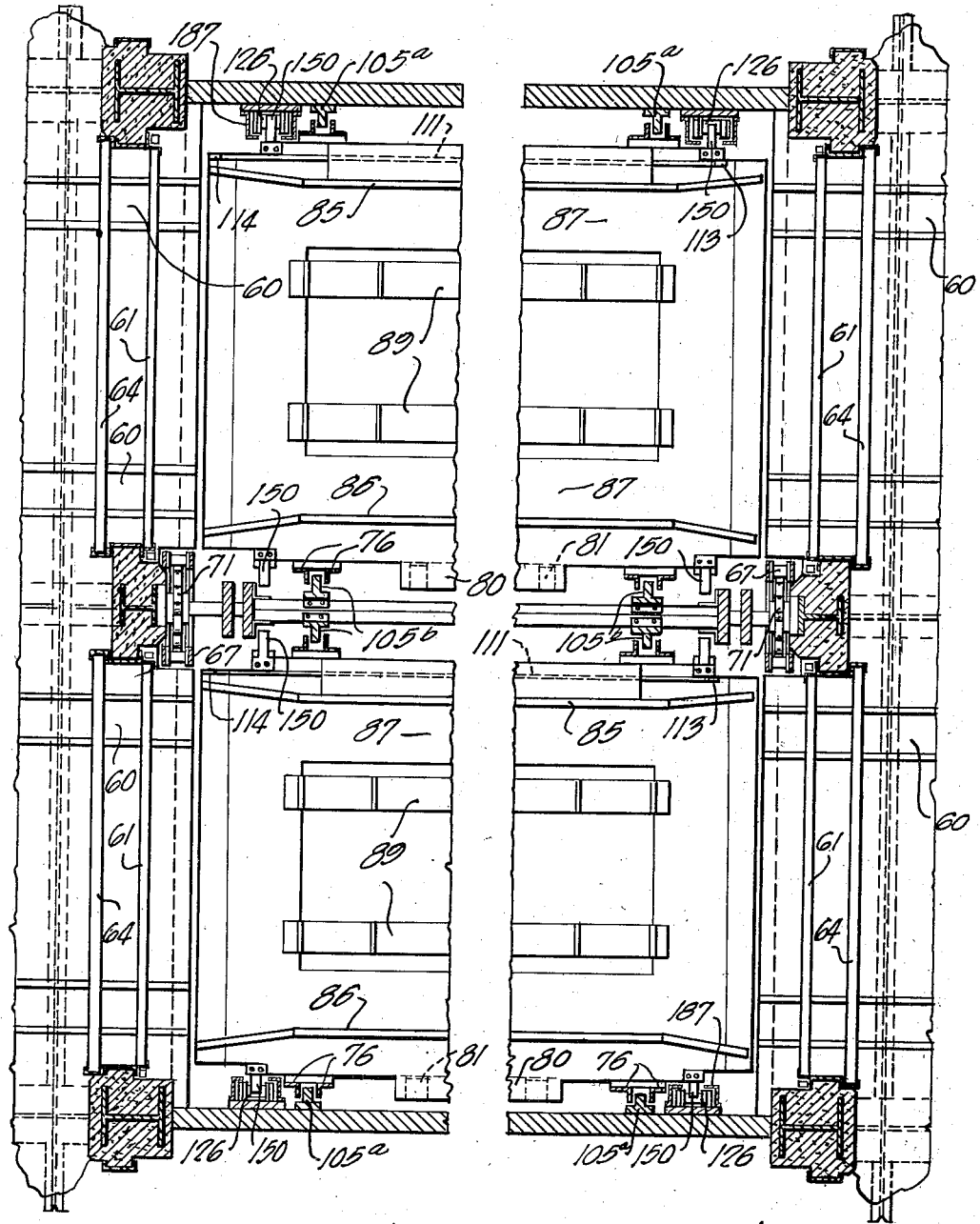
Fig. 19 is a plan view through the second floor showing two cradles of the parking unit in the loading or unloading position.

The cars are positioned upon the floor 75 of the cradle by means of vertical side rails 85 and 86, the rails being spaced from the posts 76 and having the contour shown in Fig. 19. Ways 87 inside the rails 85 and 86 receive the car wheels and since the weight of the cars is transmitted to the floor 75 by the wheels in the ways 87, this portion of the floor is further supported by angle beams 88. Planks 89 provided with cross cleats are fixed to and spaced above the floor inside the ways 87 on which the operators may walk, as will be pointed out below.

The floor 75 is preferably inclined toward the center (see Figs. 10 and 11) to permit the moisture dropping from the cars to flow through a center opening 90 into a drip pan 91 removably secured to angle beams 92. Since the planks 89 are elevated they will not interfere. As shown in Fig. 11, the opening 90 is preferably closed by a suitable grating 93, and the drip pan 91 may be provided with an outlet pipe 95 connected by a valve 96, operated by a handle 97, to a pipe 98 through which the moisture in the drip pan may be drawn off, the pipe 98 terminating in a quick detachable connection so that a hose can be readily secured and removed therefrom. The drip pan 91 is, as shown, preferably removable and is secured to the angle beams 92 in any suitable manner, as for example, by means of a pivoted tongue 100, which, as shown in Figs. 11 and 12, may be swung onto the lower flange of the beam 92 and secured thereon by means of a key 101 pivotally mounted upon a stud 102 carried by the eye beam. The tongue 100 may be drawn from engagement with the flange 92 by means of a suitable ring 103. Preferably strips of rubber 104 are mounted on the drip pan which will bear against the lower flanges of the beams 92 and provide a watertight seal.

The cradles in their travel through the wells are suitably guided except at the lower floor, as for example by T-beams 105ª and 105ᵇ supported in the well, see particularly Figs. 6 and 7. The tongues of these beams enter between the pairs of posts 76 at the sides of the cradles and thus prevent the cradles from leaving their proper position. The outer pair of beams 105ª form arcs at the top of the well, see Fig. 6, and are there engaged by the guides 83 which, as shown in Fig. 5, form continuations of the posts 76. The inner pair of beams 105ᵇ meet at points at the second and upper floors, as shown in Figs. 6 and 7. In order to prevent the cars from dropping, if, for any reason, the chains should break, there are secured to the top and bottom of the cradles between the posts 76, plates 106 and 107, see Figs. 13, 14, and 15, the edges of which are serrated at 108 and 109, respectively, so that, if the chains should break and the cradle should tilt, the teeth at diametrically opposite corners of the cradles would bite into the beams 105ª and 105ᵇ and stop the descent of the cradles.

In order to lock the cars in position in the cradles, there are mounted in the rail 85 at one side of the cradle, preferably at the right side as shown in Fig. 10, pivoted bars 110 which, by the means about to be described, may be moved from their normal position into the positions shown in dotted lines in Figs. 10 and 16. This movement of the bars may be by any suitable means, and preferably should be operated from either end of the cradle, as for example, see Figs. 5 and 18, by a bar 111 suitably guided by supports 112 and adapted to be reciprocated by means of handles 113 and 114, respectively, in which the bar 111 terminates. Near the handle 113 the bar may be provided with a series of teeth 115 which may be brought into engagement with a suitable stop 116. When the bar 111 is reciprocated in order to move the bars 110 from the full line into the dotted line position shown in Fig. 10, it will be apparent that these bars project into the way 87 between the front and rear wheels of the automobile, and thus prevent it from moving in either direction more than a short distance. The handles 113 and 114 permit an operator at either end of the cradle to swing the bars 110 into the operating position.

When it is desired to release the bars 110, an operator at the left end of the cradle, as shown in Fig. 5, can do so without difficulty by raising the handle 113 and then pushing the bar 111 forward. In order that this may be done by an operator at the right end of the cradle, a rope or cable 117 may be secured to the end of the handle 113 and then passed through suitable apertures 118 in the guides 83 to a position adjacent the handle 114. The operator at that end of the cradle can, therefore, raise the handle 113, moving the teeth 115 out of mesh with the stop 116, and can then pull the bar 111 by the handle 114, swinging the bars 110 back into their normal position. The bar 111 can be attached to each bar 110 by any suitable means as, for example, by links 119, pivoted at one end to a plate on the bar 111, and at the other end to a plate on the bar 110. The bar 111 is preferably made in two sections, as shown in Fig. 17, the outer section 120, which has the teeth 115, being pivoted by straps 121 to the main section 122 to facilitate its raising and lowering by the handle 113 and the disengagement of the locking means. Rolls 123 on the free ends of the bars 110 support the bars in their travel over the cradle floors and relieve the strain on the pivot pins 124.

Chains 125 and 126 may be provided to supplement the chains 67 in supporting the cradles. The chains 125 will hereafter be referred to as the inner supporting chains, and the chains 126 as the outer supporting chains. It will be understood that in some cases one or both of these chains may be omitted, but in general both sets are used as here illustrated and hence both sets of chains are shown and described herein. The inner chains 125 pass over head sprockets 127 and foot sprockets 128. The head sprockets 127 are mounted upon a shaft 129 suitably driven by means to be described later, while the foot sprockets 128 are supported upon a cross shaft 130. Secured at predetermined distances apart, the usual connecting plates 131 of the chain 125 are replaced by the plates 132 having tongues 133 connected by a block 135'. These tongues, as shown in Fig. 23, project below the inner edges of the cradles as they travel upwardly and downwardly in the well. The plates 132 are arranged such a definite distance apart that they come into engagement with each cradle as it arrives at the third floor in its upward travel, and as it arrives at the top floor in its downward travel. Suitable idler gears may be provided as occasion requires in order to insure that the chain is kept at all times at the proper tension.

Figure 20:
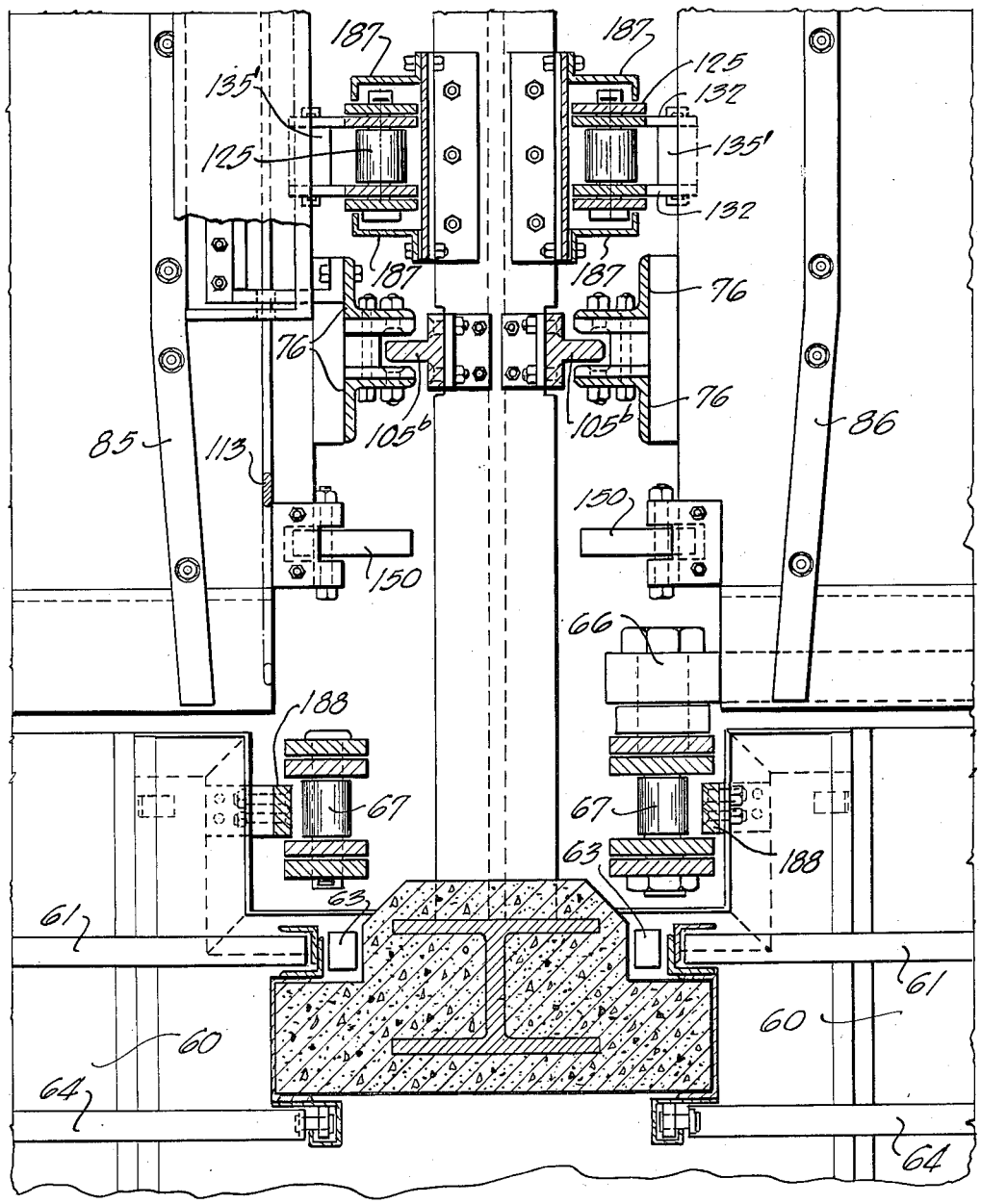
Fig. 20 is an enlarged plan view showing a portion of the ends of two cradles at a floor above the second floor.

The chains 126 pass around head sprockets 135 carried by stud shafts 136 and around foot sprockets 137, mounted upon shafts 138 in the corners of the well, as shown in Fig. 7. Referring to Fig. 6, it will be noted that the chains 126 also pass over sprockets 139 carried by a driven shaft 140 mounted at the center of the upper end of the well. Furthermore, the chains 126 also pass under the lowest floor, preferably traveling in a trench 141 covered by a removable plate or grating 142. In their travel through the trench 141, the chains are supported upon idler rollers 143, as shown in Fig. 21. The cradles are removably engaged by the chains 126 through arms 150 which are pivoted to the floor of the cradles adjacent each corner thereof. The arms 150, as shown in Fig. 15, may be mounted upon a bolt 151 which extends between walls 152 secured in any suitable manner, as by bolts 154 to the floor of the cradle. As shown in Fig. 21, the space between the walls is partially closed at the top by a wall 155 so that the member 150 normally occupies the position shown in full lines in Fig. 20. By reason of the engagement of its tip 156 with the wall 155, the member 150 may be swung into the dotted line position shown in that figure for a purpose to be described later.

As the cradle is raised by the arms 66 from its lowered position, it travels outwardly and upwardly, as shown in dotted lines in Fig. 7, being supported at that time by the arms alone. Before the cradle reaches the second floor, the members 150 on the side of the cradle adjacent the chains 126 engage the crossbars of the chains, as shown in Fig. 7, so that thereafter the outer edge of the cradle is supported by the chains 126. As the cradle reaches the upper end of the well, it is swung away from the chain 126, which continues its travel around the sprockets 135 and 139. Ordinarily, no difficulty is experienced by this engagement, but in order to avoid any complication the members 150 are so mounted that they can swing into the position shown in dotted lines in Fig. 21, and will thus release them from the chain. In place of the members 150, the chain 126 may be provided with suitably spaced plates similar to the plates 132 upon the chain 125, the crossbars 135' carried by the plates 132 being omitted. When this construction is employed, the cradles are raised by the plate tongues.

Figure 24:
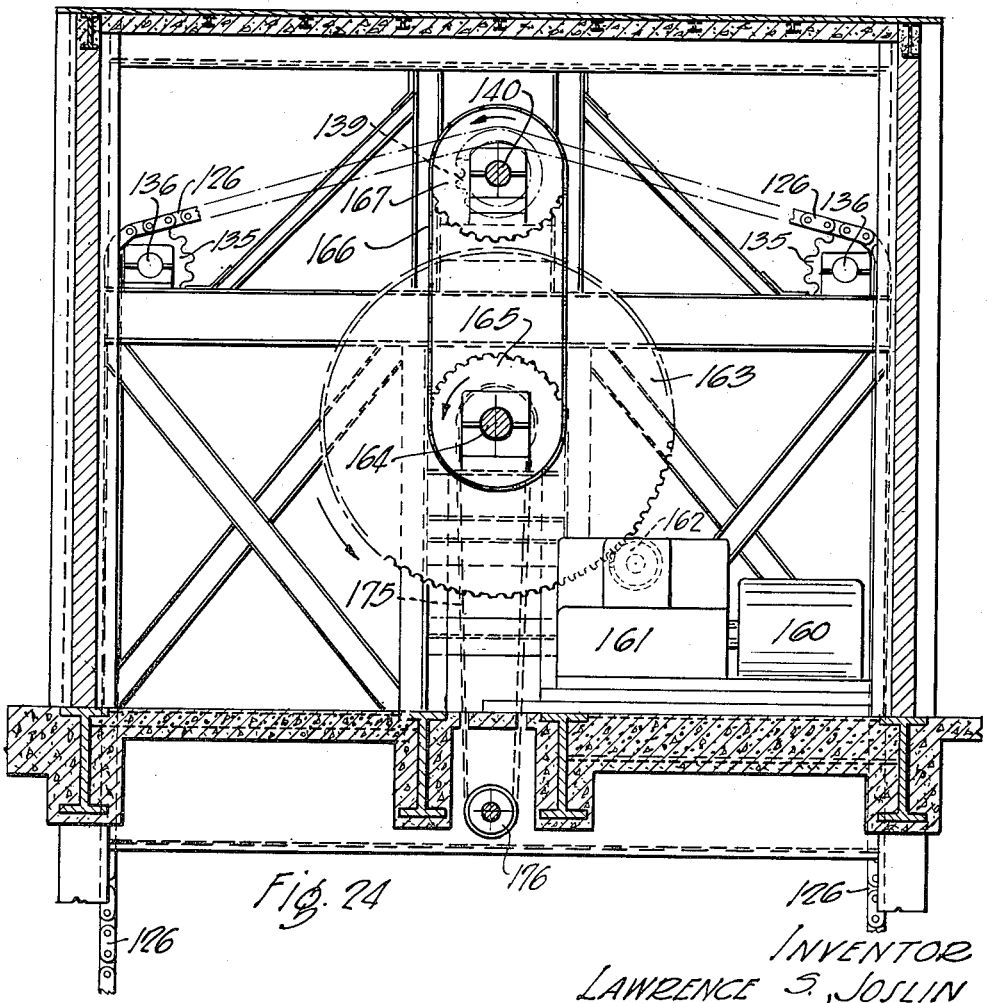
Fig. 24 is an end elevation of the driving mechanism for the parking unit at the top of the well.
Figure 25:
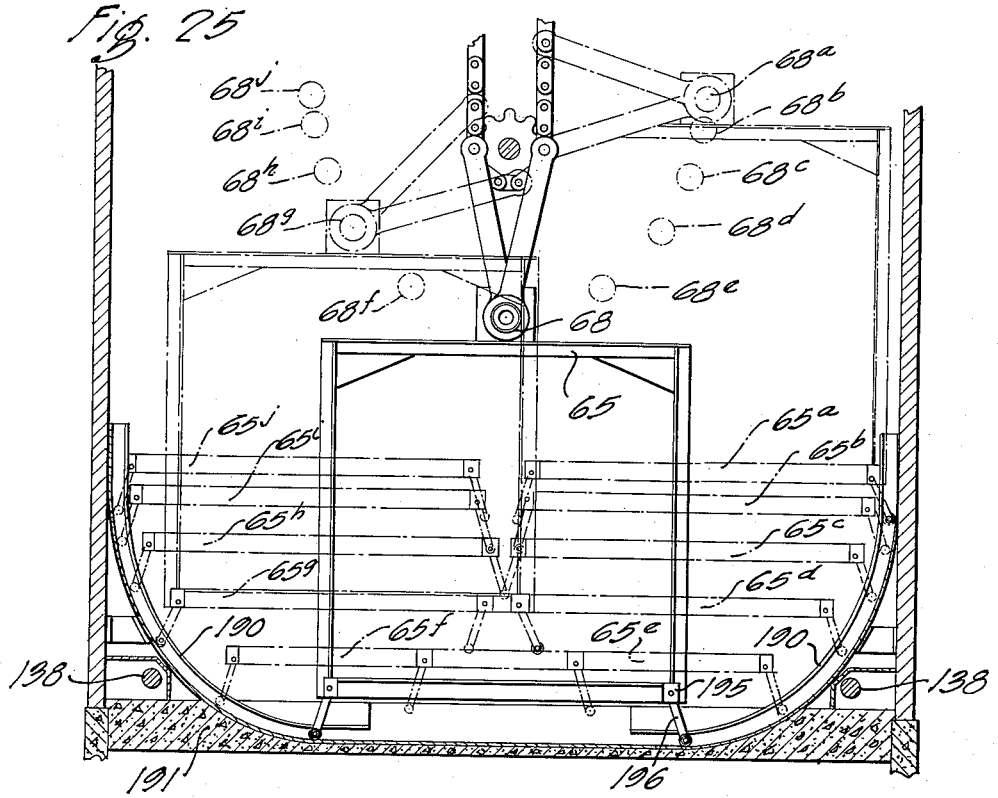
Fig. 25 is a sectional view illustrating various positions taken by the cradle in its passage from one well to another and more particularly the manner in which the cradles are held from swaying.

The chains 67, 125 and 126 all move in unison, being driven by a reversible motor 160 (see particularly Figs. 8 and 24) which, through suitable reduction gearing 161 and a gear 162, drives a large gear 163 mounted upon a stud shaft 164. Mounted on the shaft 164 are a pair of sprockets 165 which, through chains 166, drive sprockets 167 on the shaft 140. The shaft 140, which extends across the well at its center, is suitably supported in bearing blocks 168 at the ends and intermediate thereto, as may be desired. It will be noted, as shown in Fig. 8, that the bearing blocks 168 are adjustable so that the shaft 140 may be raised or lowered as required. On the end of the shaft 140 opposite to the sprockets 167 is fixed a sprocket 170 which, through a chain 171, drives a sprocket 172 on a shaft 173. The shaft 173 is directly in alignment with the shaft 164, previously described, and both act to drive the shaft 129, each having sprockets 174 which act, through chains 175, upon sprockets 176 at the ends of the shaft 129. The shaft 129 is also supported in suitable bearing blocks 177 which may be adjusted in the usual manner to raise or lower the shaft. The sprockets 70 of the chains 67 are mounted upon the shafts 164 and 173. It is thus obvious that all of the chains are driven from the motor 160, and that consequently the chains travel in unison. The shafts 164 and 173 are supported in adjustable bearing blocks 180, and are also supported at their inner ends on bearings 181 which extend from the uprights 182 on which the bearings 180 and 168 are supported. The hangers 181 extend below the sprockets 70 and thus interfere in no way with the movement of the chains.

Suitable means are provided for supporting the chains, and also preventing any possible drop of the chains should any link thereof break. As shown particularly in Fig. 6, the chains 126 as they travel between the sprockets 135 and 139 pass over channel bars 185 suitably supported by hanger straps 186. The chains 125 and 126 travel between Z-bars 187 which do not interfere with the movement of the chains but which extend in front of the crossbars to prevent the chains from falling forward into the elevator wells in case of any breakage (see Figs. 20 and 6). Guard bars 188 are mounted in the well in front of the chains 67 and prevent the chains from falling away from the teeth of the sprockets 70, 71 and 72. As a further protection, circuit breakers 189 are mounted in the trench 141 below the foot sprockets 137 which will be tripped in case the chain 126 breaks and thereupon will stop the motor 160 in the usual way. Similar means (not shown) are provided for the chains 67 and 125.

Figure 26:
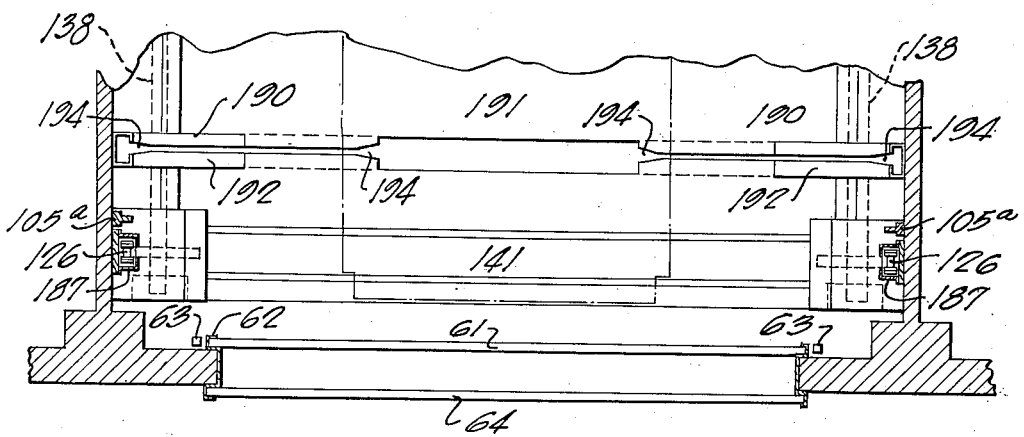
Fig. 26 is a plan view of the shaftway.
Figure 31:
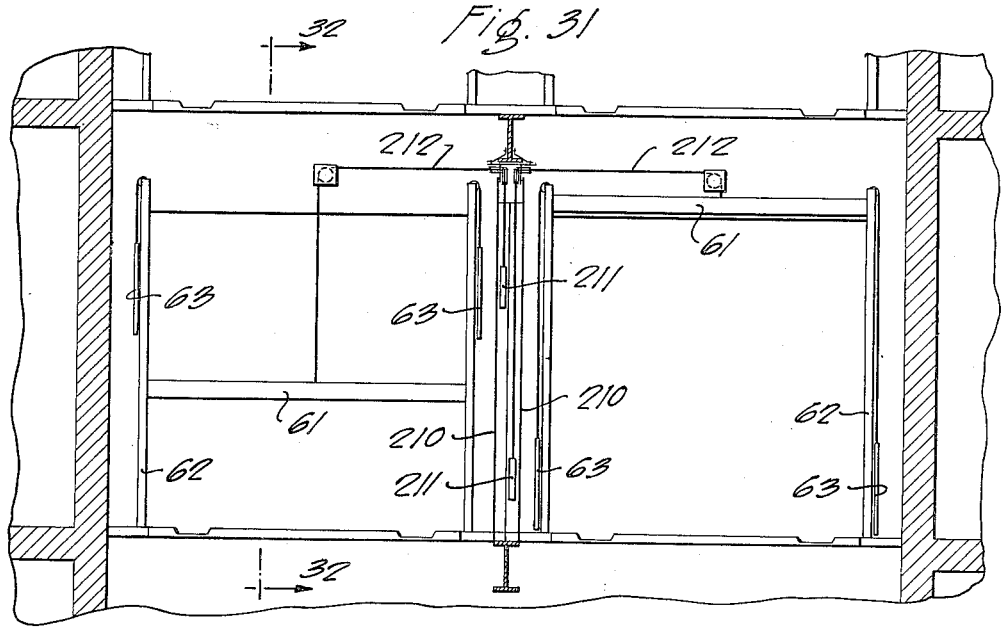
Fig. 31 is an elevation of two adjacent entrances to the cradles, the gate of one entrance being raised and the gate of the other entrance being lowered.
Figure 32:
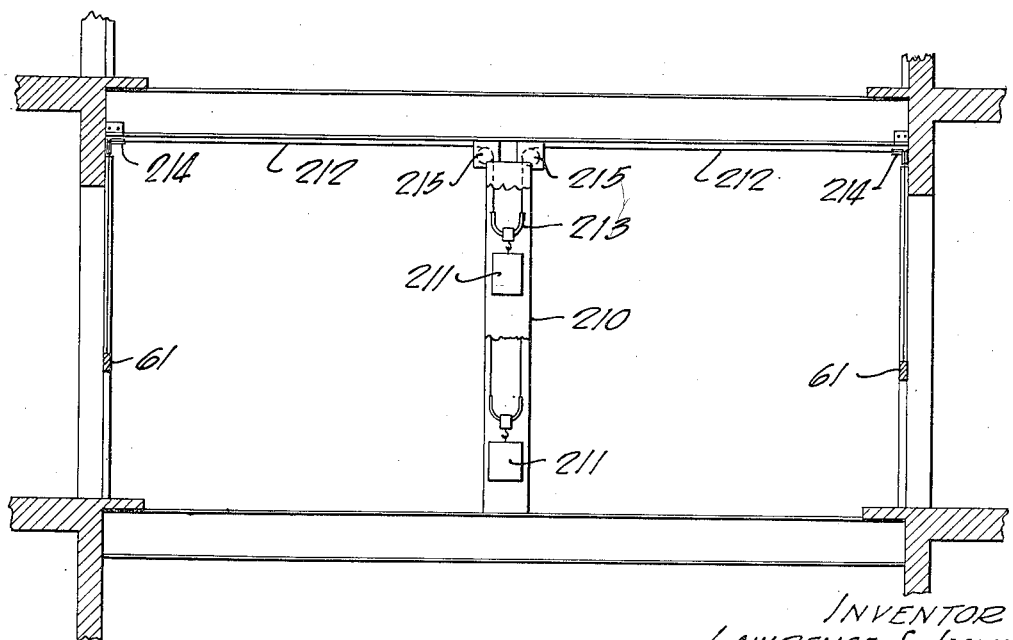
Fig. 32 is a sectional view taken along the line 32—32 of Fig. 31 illustrating the mechanism by which the gates are moved in unison.

Means to prevent swaying of the cradles as they travel through the passages from one well to the other at top and bottom may be provided at both ends of the wells. Figs. 25 to 30 inclusive illustrate this construction at the bottom but it will be understood that a similar construction could if desired be employed at the top. In the bottom passage are mounted curved tracks 190 (see Fig. 10) which extend from the side walls below the floor 191 parallel to the trenches 141. The track 190 is open at the center as shown in Fig. 29, but is elsewhere partially closed by flanges 192 which may be integral as shown in Fig. 26 or secured to the base, as shown in Fig. 30. Secured to the flanges 192 of the tracks below the floor are parallel walls 193 (Fig. 30). The ends of the flanges 192 are preferably cut away to provide divergent mouths 194.

Mounted upon blocks 195 secured to the beams 88 at the floors of the cradles are arms 196. One end of each arm enters through a slot 197, a recess 198 in the block and is secured therein by a pin 199. The walls defining the recess 198 are formed, as shown in Fig. 27, so that the pivotal movement of the arm is confined between limits. Through the other end of the arm 196 is passed a pin 200 which supports rollers 201 at opposite sides of the arm.

The coaction of the arms 196 with the tracks 190 will be described with particular reference to Fig. 26, wherein are disclosed in full lines a cradle 65 at the bottom and in dotted lines portions of a plurality of cradles 65ᵃ to 65ʲ inclusive. The corresponding positions taken by the pipe 68 are indicated on this figure by the reference characters 68ᵃ to 68ʲ inclusive. Assuming that the cradle is descending in the right-hand well and ascending in the left-hand well, it will be noted that the cradle 65ª has moved laterally to the left out of engagement with the outer supporting chains 126. The forward arm 196 at the right side, however, has entered the track 190 and the flanges 192 thereof engage the rollers 201 and steady the cradle. As the cradle moves through the positions designated as 65ᵇ to 65ᵉ inclusive, the arms 196 at the right side continue to function. In passing from position 65ᵉ to the full line position the forward arm 196 at the left side descends between the walls 193 into the central portion and the rollers 201 thereon are carried below the flanges 192 so that in the position shown in full lines the cradle is held by the arms on both sides. While moving to the position indicated as 65ᶠ the arms 196 on the right side move upwardly from the track between the walls 193 and the cradle is thereafter steadied by the arms on the left side alone. It will be apparent that the sequence will be reversed if the cradle is descending in the left-hand well and ascending in the right-hand well. The limits of movement of the arm defined by the wall of the recess 198 are obviously such that the arms can enter and leave the tracks without binding.

Figs. 31 to 37 inclusive illustrate in detail one way of insuring the uniform raising and lowering of the pair of gates at opposite ends of a cradle. Enclosed within a housing 210 between the wells (see Fig. 31) and approximately equidistant from the gates at the ends of a cradle are weights 211. Each weight is connected with the gates of one pair by a cable 212 fixed at its center in a two-part curved member 213, from which the weight 211 is suspended. The cable is guided between the gates and the weight by a plurality of pulleys 214 supported by blocks 215 suitably located and secured to the frame of the well. The housing 210 preferably comprises two compartments, each of which encloses one of the weights 211. The cable 212 is so clamped by the member 213 that it can not shift relative thereto. Hence when either gate 61 is raised the length of cable connecting that gate with the weight becomes slack, whereupon the weight 211 descends and causes the length of cable connecting the weight with the other gate to raise that gate in unison with the first gate. If a raised gate is lowered the reverse takes place and the other gate of the pair is lowered, since the weight 211 is raised and the slack in the cable connecting the weight with such gate causes the gate to descend by gravity. The counterweights 63 are preferably retained to insure a smooth action of the gates but might under certain conditions be omitted.

In place of forming the channels 60 in the floors, it has been found desirable in some types of constructions to provide guides for the cars which can be easily removed whenever desired, as for example when, due to temporary conditions, the car must be moved laterally over the floor to a cradle other than that by which it was raised. Such guides are shown in Figs. 38 to 49 inclusive of the drawings. The guide 220 per se, there illustrated, may be an inclined strip U-shaped in cross section and supported by posts 221 similar in cross section, the legs of which project as shown in Figs. 38, 45, and 46, beyond the guide. Mounted in the floor are anchors 222 provided with slots 223, which receive the legs of the posts and hold the guides in place. The anchors 222 are preferably fixed permanently in the floor and each comprises a support 224 on which are mounted blocks 225 in which the slots 223 are formed. The supports are secured to the concrete forms 226, as shown in Fig. 38, before the concrete is applied and are of such dimensions that the upper faces of the blocks 225 are in the plane of the finished floor. The slot 223 at one end leads into a recess 227, preferably having an inclined side wall. The legs of the posts, when at one end of the slots, are held upright but when moved to the other end may be tilted into the recesses 227 to remove the guide from contact with the wheel of a car and then lifted out of the slots as shown in dotted lines in Fig. 38. The posts 221 may be reinforced by U-braces 228 and 229 and the latter brace may be engaged by a hook or suitable tool to shift the post and guide. The exposed ends of the guides may be closed by a cover 230 and an opening 231 may be provided to facilitate the removal of the cover.

As shown in Fig. 49, the guides forming one wall of a channel may abut and the upper edges of the guides may be reinforced by strips 232, which abut and extend between the posts, the strip at one end of one guide projecting into the end of the abutting guide and thus insuring that the ends are held in alignment. The projecting ends are of such length that the guide will be separated therefrom when moved longitudinally, as set forth above, prior to its removal. The anchors 222 are right and left-handed and arranged in rows, as shown in Figs. 45 and 46 or 47 and 48, so that the guides provide channels which will accommodate a car of the standard tread and alternate channels in which the operators can walk. If desired the guides may be separated to provide aisles across the channels.

Referring to Fig. 1, it will be noted with respect to the unit by which access is had to the basement that only at the street floor can two cradles deliver or receive cars. This is due to the difference between the heights of the basement and first floor and the upper floors. Hence, when such a unit is employed, only one cradle at a time can deliver or receive cars at the upper floors. The units can be driven in either direction, and a loaded cradle can pass over at the top or bottom of the wells without danger or difficulty due to the manner in which the arms 66 are secured to the ends of the pipes 68. The bars 105ª, as pointed out above, engage the brackets 83 on the cradle and the tracks 190 which engage the arms 196 on the cradles. If desired, the upper portion of the bars 105ª may be replaced or supplemented by tracks similar to the tracks 190 and arms similar to the arms 196 may be provided at the tops of the cradles.

The operation of the rotary parking units is as follows:

The driver of the car drives into the garage through the entrance door and is directed to one of the units. The floor man opens the gate to the cradle of the unit on the end where the car is to enter and when one gate is opened the gate on the opposite end is automatically opened at the same time.

The driver drives his car directly onto one of the cradles which will be at the floor level, he leaves his brakes off and the gears in neutral, gets out of the car and steps out of the elevator well and is given a check—say B—20—which is stamped with the time. The floor man retains a stub from the same check, which he turns in to the office and a duplicate check B—20, with a stub marked the same, is put on the car.

The floor man then locks the car in place by throwing the bars 110, and as soon as the driver is out of the elevator well the gates are closed (which is done either manually or by power) and a button is pushed and the hoisting mechanism is put in operation and another cradle brought to a level with the first floor ready to receive the next car.

This operation is repeated until all cradles in this unit are filled, and the floor man starts to load another unit. With several units in the building one or more units can be loading at the same time. When all, or approximately all, of the cradles in one or more of the units are filled and ready to unload, two men go to the top floor by means of an elevator, hoist or stairs, and start to unload the cars on the top floor in as many units as are ready.

They manually open the gate in one-half of one of the units, which operation automatically opens the opposite gate. They then move the car onto the floor, tearing off the stub from the check on the car and writing on same the number of the floor and the number of the stall and taking this check with them, leaving the original check of B—20 on the car. They then repeat the operation on the other half of the same unit and on all other units on this floor which are ready to unload, after which they go to the floor below, either by stairs, elevator, hoist or sliding poles, and repeat the same operation as on the top floor.

When they have unloaded the cars on the floors above the first floor and arrive at the first floor they have unloaded all but the car in the pent house and the car on the first floor level and the unit has not been in operation during the time of unloading. The unit is then ready to start all over loading cars on each cradle as before and the unloading is done as before.

The man who has the stubs of the car checks then gives them to the floor man, who distributes them in a rack which is provided for each unit and which has a place for each number. When all the car stalls throughout the building are filled, the various cradles in the different units are then filled with the exception that one, two, three, four or more cradles are left empty (these are usually in a row) depending on whether the particular unit serves one, two, three, four or more car stalls on one or both sides of the unit on the storage floors.

When the driver returns for his car he presents his check B—20 to the cashier, pays what is due, and receives the claim stub properly stamped, which he then presents to the floor man at unit B. The floor man then takes out of the rack the stub of the corresponding number and can then tell on just what floor and stall the car is located. Two men are then sent to the floor, either by the cradles of the units, elevator, hoist or stairs, and load the car wanted onto one of the vacant cradles. If there are other cars between the unit and the car wanted, they are loaded onto the other vacant cradles and then unloaded back where they were or put in any other vacant stall. When they are put in any other stall the floor man takes a blank stub and puts a number on same, together with the floor and number of car stall. This stub is put in place of the original stub at the first floor and the original stub is destroyed. Thus the stub always shows just where the car is located.

As the cradles become empty cars are put on same from the various floors, and the stub changed to one which shows the number of the cradle the car is left on, so that at the end of each day the last of the cars to be taken out are all located on the various cradles in the units, and these are brought to the first floor by simply pushing the right button, which automatically brings the cradle wanted to the first floor by the shortest route.

When the cradle with the car that is to be delivered, arrives at the first floor, the gates are opened, the locking device is released and the driver steps into his car and drives it out, or the floor men push the car off the cradle onto the first floor, where the driver steps into the car and drives out.

The advantage of having opposite gates work together is so that no car either driving onto a cradle or being pushed on or off a cradle can bump and damage the gates or the car, and whenever any gate is open on any floor of any unit it is so arranged that the mechanism of the unit will not operate until all gates are closed, and this can also be arranged so that when gates anywhere on any unit are opened, a red light will show at all floors, and when they are closed a green light will show.

The cradles of each unit are numbered consecutively. Electric push buttons are installed at each end of each unit where storage space is provided from each end of the units, and on one end only when storage space is provided only on one end, and also on each floor in such a manner that any platform can be brought to any floor as wanted, by the shortest route.

While the drawings disclose and the foregoing specification describes in detail certain features embodying my invention, it will be understood that I am not limited thereto and that other embodiments or changes in the present embodiments may be made without departing from the spirit and scope of my invention as set forth in the following claims.

I claim:

1. In an elevator system comprising a well, a cradle traveling in said well, means in contact with the cradle at all times for moving it through the well and supplemental means in contact with the cradle only during its travel through the well for assisting said moving means, said moving means including chains pivotally connected to said cradle at the top approximately midway between the side walls thereof and said supplemental means comprising chains and plates carried thereby, which plates include tongues which extend below the lower side edges of the cradle during its travel through the well.

2. In an elevator system comprising parallel wells, cradles which travel successively through said wells, means for moving the cradle through the wells and from one well to the other well and means for preventing swaying of the cradles as they travel through the passage from one well to the other well, said sway-preventing means comprising tracks fixed in said passage, and arms attached to the cradles at opposite edges, which arms enter said tracks during the travel through the passage, the arms at one edge only of the cradles engaging certain of the tracks as the cradles enter the passage and the arms at the other side only of the cradles engaging other of the tracks as the cradles are part way through the passage and remaining in engagement therewith until the cradles leave the passage.

3. In an elevator system comprising parallel wells, cradles which travel successively through said wells and means for preventing swaying of the cradles as they travel through the passage from one well to the other well, said sway-preventing means comprising tracks fixed in said passage, and arms attached to the cradles at both sides thereof, the arms on one side of the cradles engaging certain of said tracks when the cradles enter the passage and the arms on the other side of the cradles engaging other of said tracks when the cradles are part way through the passage.

4. In an elevator system comprising parallel wells, cradles which travel successively through said wells and means for preventing swaying of the cradles as they travel through the passage from one well to the other well, said sway-preventing means comprising tracks fixed in said passage, and arms attached to the cradles at both sides thereof, the arms on one side of the cradles engaging certain of said tracks when the cradles enter the passage and the arms on the other side of the cradles engaging other of said tracks when the cradles are part way through the passage, the arms which first engage the tracks leaving the same after the other arms engage the tracks so that the cradles are at all times steadied by the tracks.

5. In an elevator system comprising parallel wells, cradles which travel successively through said wells and means for preventing swaying of the cradles as they travel through the passage from one well to the other well, said sway-preventing means comprising tracks fixed in said passage, portions of said tracks having flanges, arms attached to the cradles at both sides thereof, and rollers supported by said arms, which rollers during the travel of the cradles enter the tracks below the flanges thereof whereby the flanges and rollers coact to steady the cradles, the rollers on one side of the cradles engaging certain of the tracks when the cradles enter the passage and the rollers on the other side of the cradles engaging other of said tracks when the cradles are part way through the passage.

6. In an elevator system comprising parallel wells and a cradle, means for moving said cradle through the wells and from one well to the other comprising chains, two arms projecting from each chain, said arms being secured in place by bolts passed through one end of each arm which bolts unite the links of the chain, and a pipe supported at the top of said cradle to which pipe the free ends of said pair of arms are rotatably attached, said arms being offset relative to each other so that the ends of the arms attached to the chain are in the same vertical plane and the ends of the arms attached to the pipe are in parallel vertical planes, and movable means supplementing said cradle moving means during the travel of the cradle through the wells.

7. In an elevator system including a well and a cradle adapted to travel in said well, means for reciprocating the cradle in the well, guide beams in the well, spaced angles on the cradle, between which angles the guide beams enter, and means carried by the cradle between the angles, which means in case the cradle should drop and tilt while dropping will engage the guide beams and hold the cradle against dropping.

8. In an elevator system comprising parallel wells, a cradle traveling in said wells, means in contact with said cradle at all times for moving it through the wells and from one well to the other and supplemental means in contact with the cradle only during its travel through the wells, said moving means including chains traveling between the wells and pivotally connected to said cradle and said supplemental means comprising chains which travel around said wells and members carried by said cradle which members engage the chains during the travel of the cradle through the wells.

9. In an elevator system comprising parallel wells, a cradle traveling in said wells, means in contact with said cradle at all times for moving it through the wells and from one well to the other and supplemental means in contact with the cradle only during its travel through the wells, said moving means including chains traveling between the wells, and arms pivotally secured at one end to the chains and pivotally secured at the other end to said cradle, and said supplemental means comprising chains and members carried by said cradle which members engage the chains during the travel of the cradle through the wells.

10. In an elevator system comprising parallel wells, a cradle traveling in said wells, means in contact with said cradle at all times for moving it through the wells and from one well to the other and supplemental means in contact with the cradle only during its travel through the wells, said moving means including chains traveling between the wells and arms pivotally secured at one end to the chains and pivotally secured at the other end to a pipe at the top of the cradle and said supplemental means comprising chains which travel around said wells and members carried by said cradle which members engage the chains during the travel of the cradle through the wells.

11. In an elevator system comprising parallel wells, a cradle traveling in said wells, means in contact with said cradle at all times for moving it through the wells and from one well to the other and supplemental means in contact with the cradle only during its travel through the wells, said moving means including chains traveling between the wells and pivotally connected to the cradle and said supplemental means including chains traveling between the wells and plates carried thereby said plates engaging the cradle during the travel of the cradle through the wells.

12. In an elevator system comprising parallel wells, a cradle traveling in said wells, means in contact with said cradle at all times for moving it through the wells and from one well to the other and supplemental means in contact with the cradle only during its travel through the wells, said moving means including chains traveling between the wells and pivotally connected to the cradle and said supplemental means including chains traveling between the wells and plates carried thereby said plates engaging the cradle during the travel of the cradle through the wells and chains traveling around the wells and members carried by said cradle which members engage the chains during the travel of the cradle through the wells.

13. In an elevator system comprising parallel wells, a cradle traveling in said wells, means in contact with said cradle at all times for moving it through the wells and from one well to the other and supplemental means in contact with the cradle only during its travel through the wells, said moving means including chains traveling between the wells and arms pivotally secured at one end to the chains and pivotally secured at the other end to said cradle and said supplemental means including chains traveling between the wells and plates carried thereby, said plates engaging the cradle during the travel of the cradle through the wells.

14. In an elevator system comprising parallel wells, a cradle traveling in said wells, means in contact with said cradle at all times for moving it through the wells and from one well to the other and supplemental means in contact with the cradle only during its travel through the wells, said moving means including chains traveling between the wells and arms pivotally secured at one end to the chains and pivotally secured at the other end to said cradle and said supplemental means including chains traveling between the wells and plates carried thereby, said plates engaging the cradle during the travel of the cradle through the wells and chains traveling around the wells and members carried by said cradle which members engage the chains during the travel of the cradle through the wells.

LAWRENCE S. JOSLIN.